(12) United States Patent
Takahashi et al.

(10) Patent No.: US 7,803,304 B2
(45) Date of Patent: Sep. 28, 2010

(54) METHOD AND APPARATUS FOR MANUFACTURING PLATE-LIKE STRUCTURE

(75) Inventors: Ryoichi Takahashi, Yokohama (JP); Masatoshi Sakurai, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1402 days.

(21) Appl. No.: 11/234,232

(22) Filed: Sep. 26, 2005

(65) Prior Publication Data
US 2006/0065136 A1   Mar. 30, 2006

(30) Foreign Application Priority Data

Sep. 27, 2004   (JP)   ............. 2004-278674
Dec. 8, 2004    (JP)   ............. 2004-355792

(51) Int. Cl.
*B29D 17/00* (2006.01)
*B29C 43/02* (2006.01)
*B29C 35/00* (2006.01)
*B29C 37/00* (2006.01)

(52) U.S. Cl. ............. 264/320; 977/887; 425/411; 264/293

(58) Field of Classification Search ......... 264/293, 264/107, 320; 977/887; 425/411
See application file for complete search history.

(56) References Cited

U.S. PATENT DOCUMENTS 1,448,376 A * 3/1923 Berger ............. 264/107
4,313,718 A * 2/1982 Llabres et al. ....... 425/290
5,772,905 A   6/1998 Chou et al.
2002/0020484 A1 * 2/2002 Feist et al. ......... 156/196

FOREIGN PATENT DOCUMENTS

JP   2003-157520   5/2003

OTHER PUBLICATIONS

L. Malaquin, F. Carcenac, C. Vieu, M. Mauzac, Using polydimethylsiloxane as a thermocurable resist for a soft imprint lithography process, Microelectronic Engineering, vol. 61-62 (2002), pp. 379-384.*

Stephen Y. Chou, et al., "Imprint of sub-25 nm vias and trenches in polymers", App. Phys. Lett., vol. 67, No. 21, Nov. 20, 1995, pp. 3114-3116.

* cited by examiner

*Primary Examiner*—Matthew J. Daniels
(74) *Attorney, Agent, or Firm*—Oblon, Spivak, McClelland, Maier & Neustadt, L.L.P.

(57) ABSTRACT

A method for manufacturing a plate-like structure, the method including a step of transferring concave and convex patterns on a master to a surface of a transferred substrate by sandwiching the master provided with the concave and convex patterns and the transferred substrate, between a press surface of a hollow cylindrical upper and a press surface of a lower mold, and pressurizing central parts of the upper and lower molds to apply pressure to the master and the transferred substrate, wherein a compressive load imposed on inner peripheral portions of the upper and lower molds is blocked and distributed toward outer peripheries of the upper and lower molds.

4 Claims, 22 Drawing Sheets

RELATED ART

RELATED ART

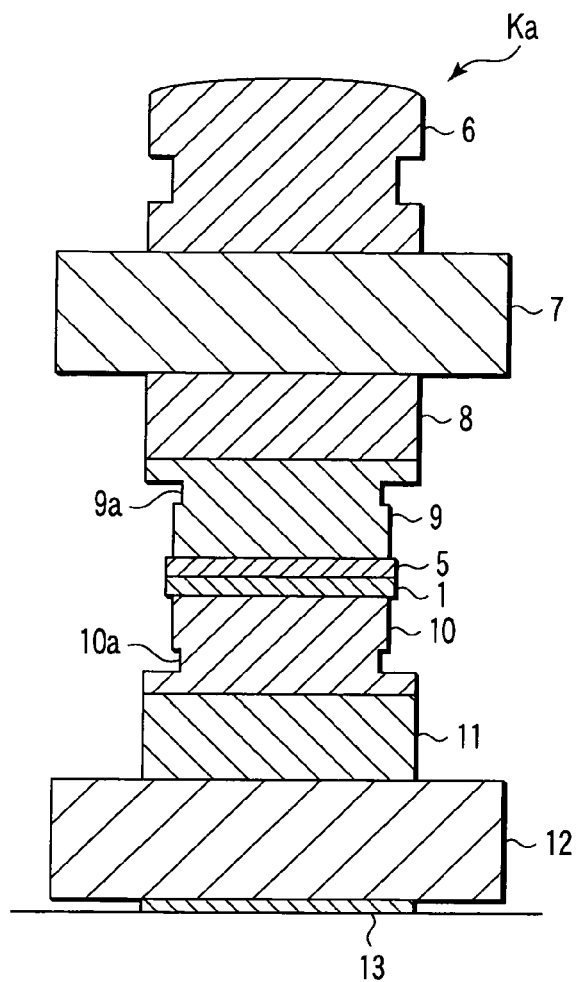
F I G. 13
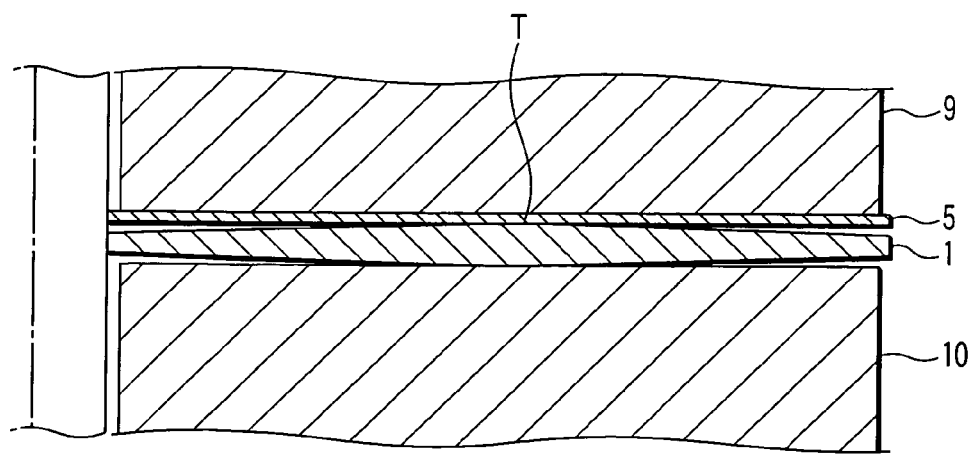
F I G. 14

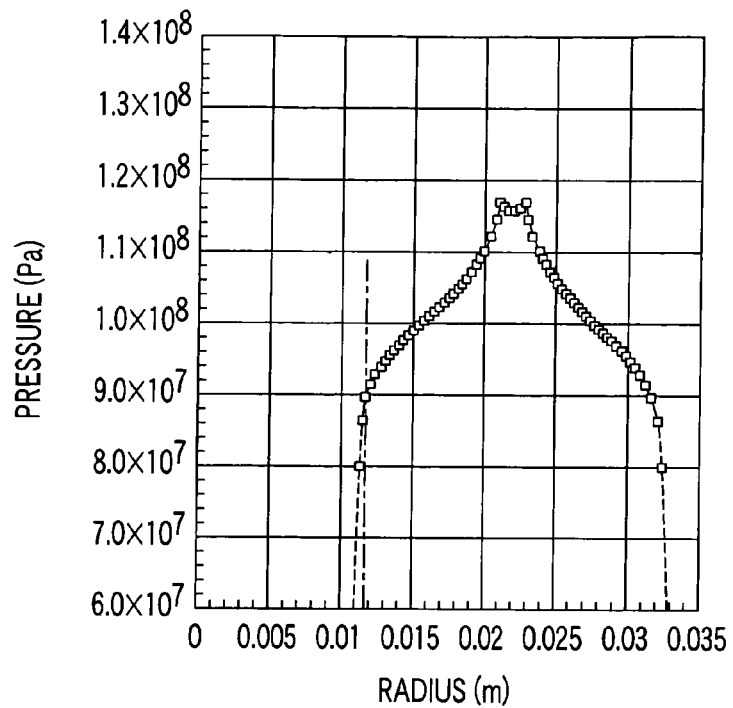
F I G. 15A
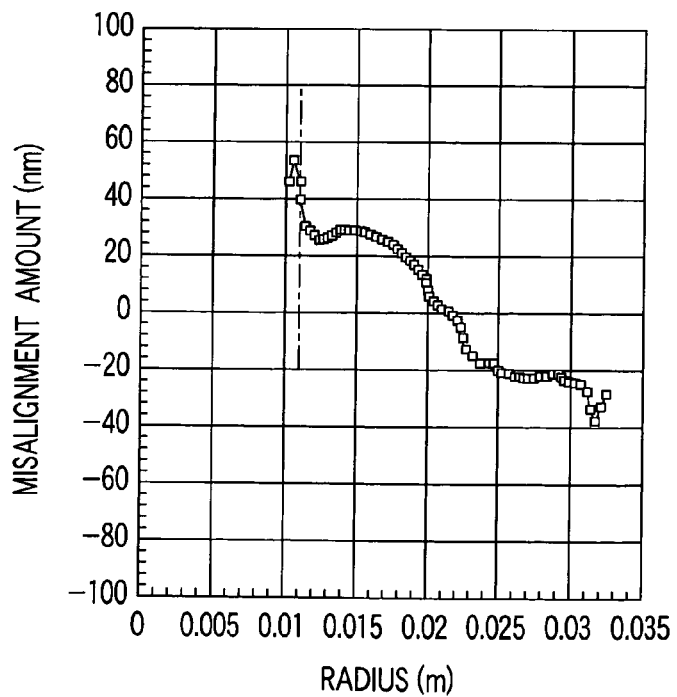
F I G. 15B

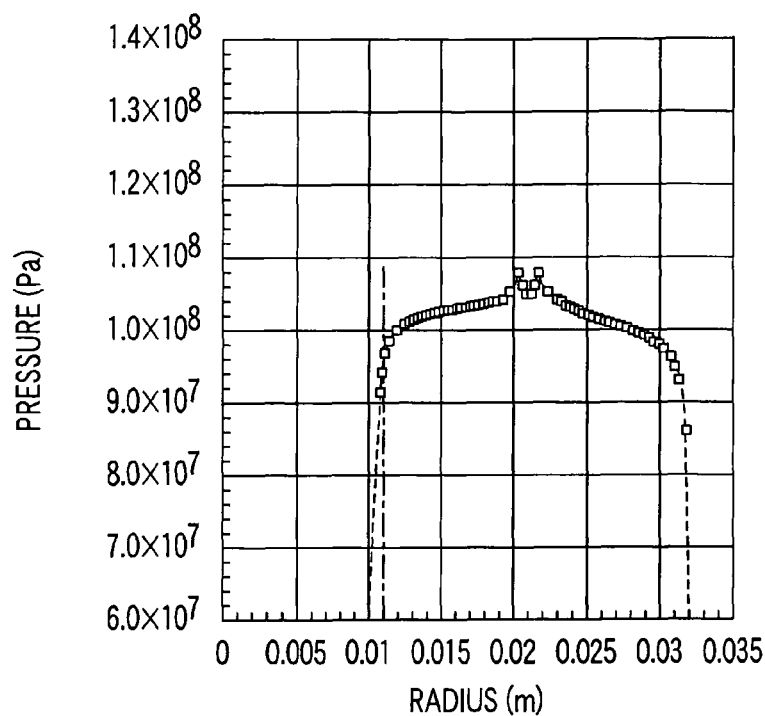
F I G. 19A
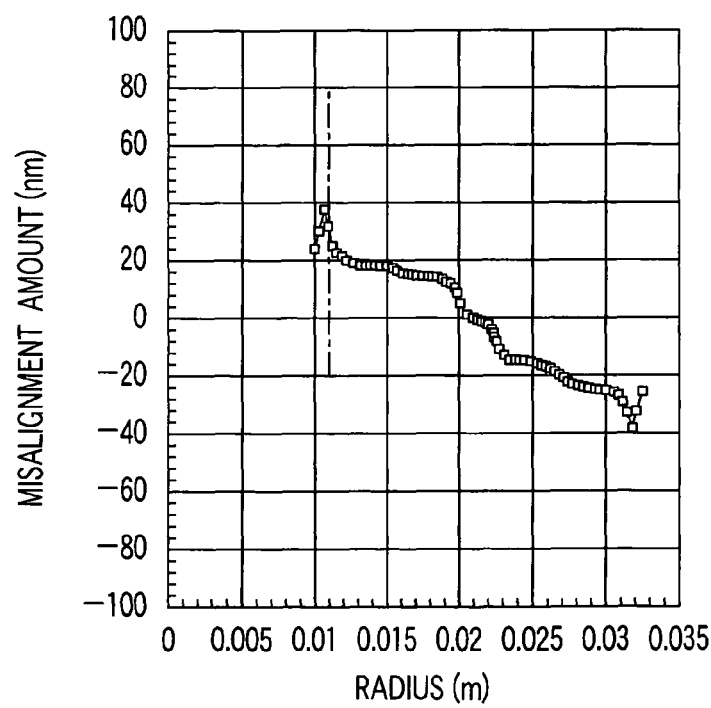
F I G. 19B

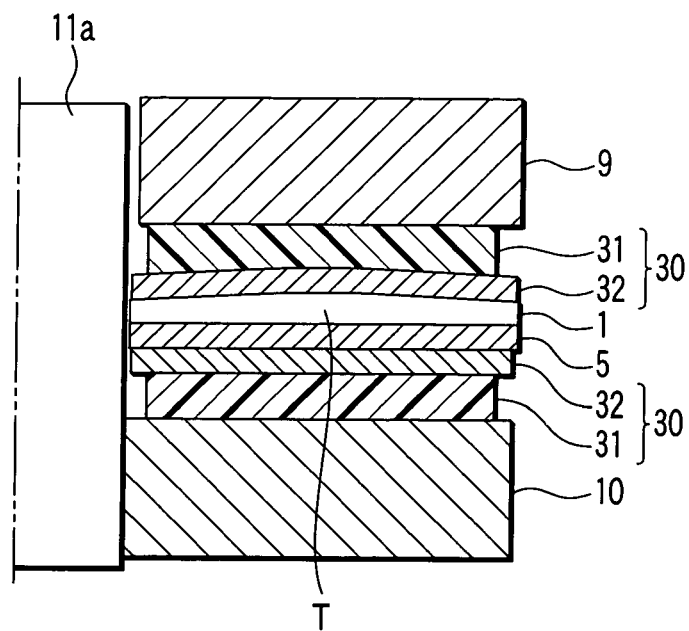
F I G. 20A
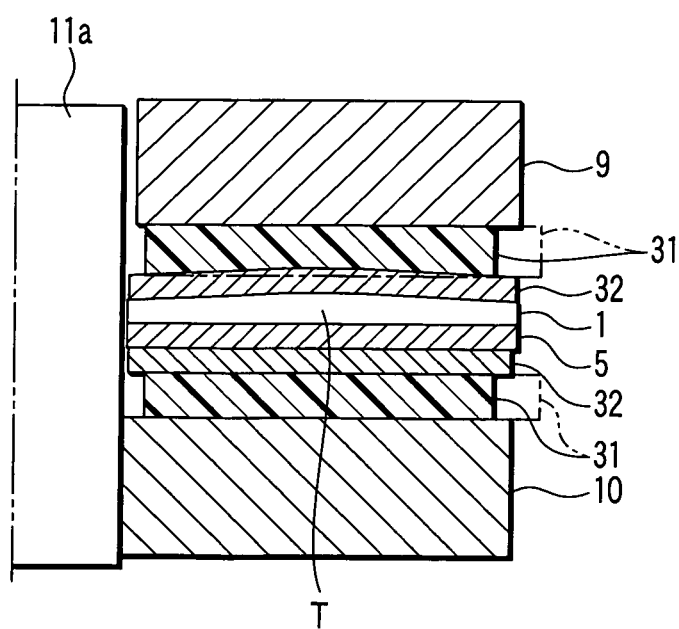
F I G. 20B

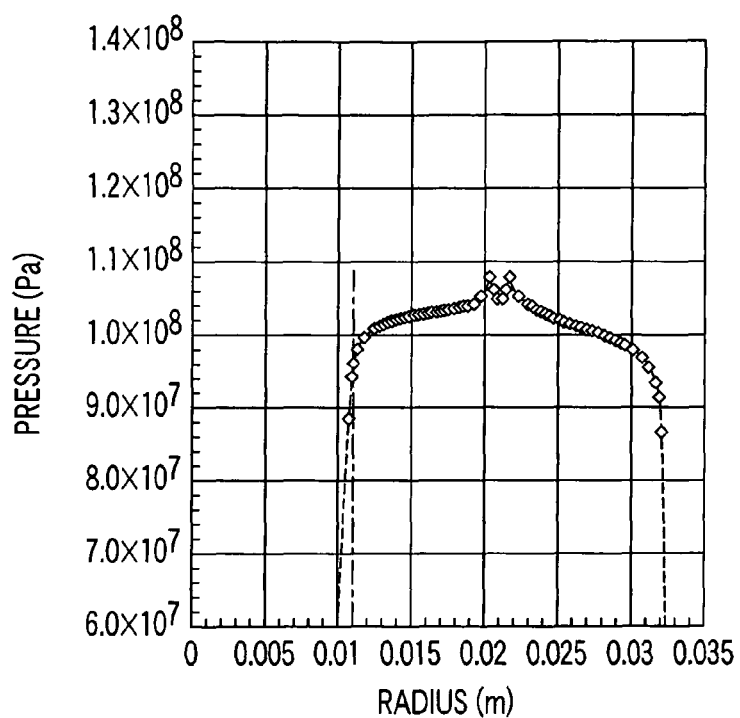
F I G. 21A
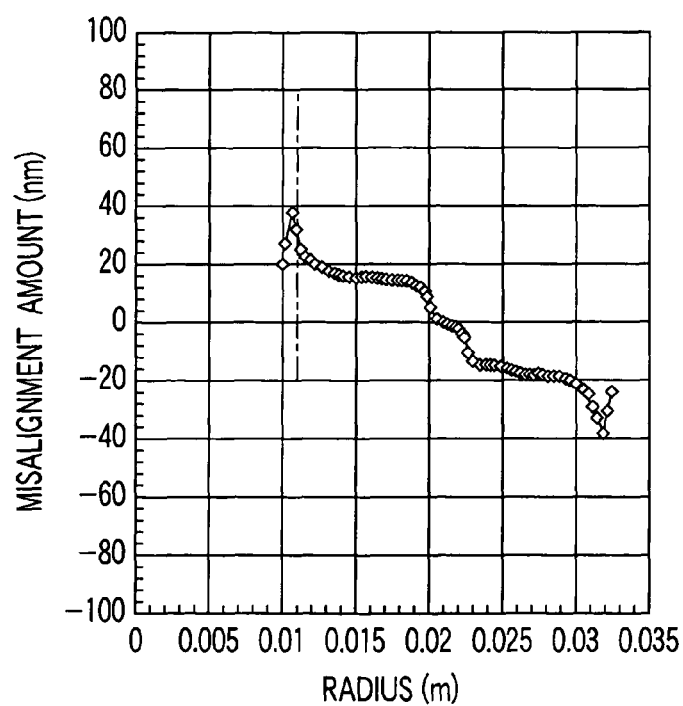
F I G. 21B

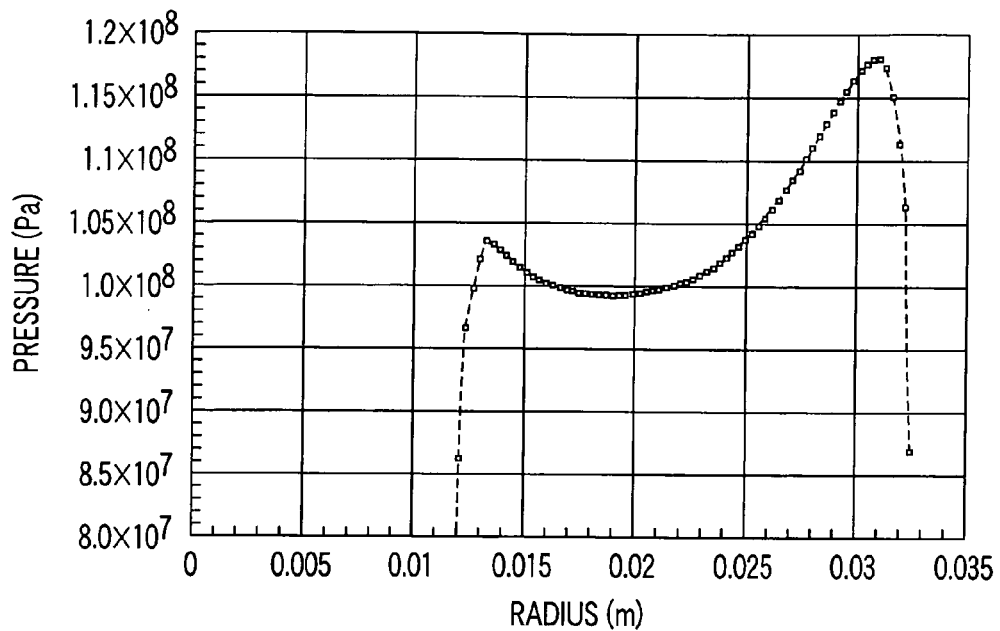
FIG. 24
PRIOR ART
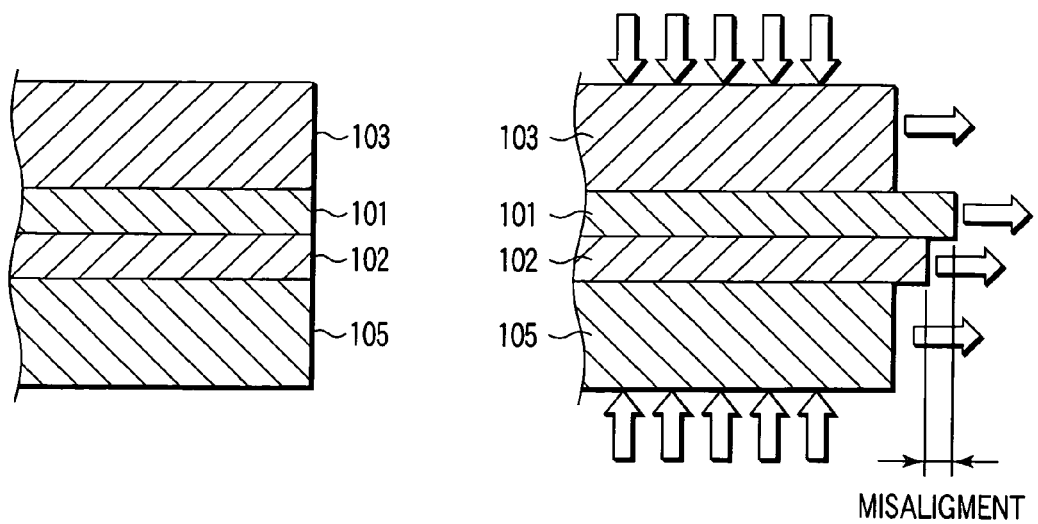
FIG. 25A
PRIOR ART
FIG. 25B
PRIOR ART

METHOD AND APPARATUS FOR MANUFACTURING PLATE-LIKE STRUCTURE

CROSS-REFERENCE TO RELATED APPLICATIONS

This application is based upon and claims the benefit of priority from prior Japanese Patent Applications No. 2004-278674, filed Sep. 27, 2004; and No. 2004-355792, filed Dec. 8, 2004, the entire contents of both of which are incorporated herein by reference.

BACKGROUND OF THE INVENTION

1. Field of the Invention

The present invention relates to a method and apparatus for manufacturing a plate-like structure, for example, recording media such as a hard disk, a semiconductor, or a magnetic transfer disk.

2. Description of the Related Art

In recent years, significant enhancement of information equipment such as personal computers has sharply increased the amount of information that must be handled by users. In this situation, expectations are being placed on information recording and reproducing apparatuses having a much higher recording density or semiconductor devices having a much higher degree of integration.

A finer machining technique is required to improve the recording density of recording media. Conventional photolithography techniques using an exposure process enable a large area to be micromachined at one time. However, these techniques do not provide a resolution equal to or less than the wavelength of light. Thus, it is difficult to form a microstructure of a size of at most 200 nm using the conventional photolithography technique.

Examples of machining techniques for a size of at most 200 nm include electron beam lithography and focused ion beam lithography. However, disadvantageously, these techniques cannot provide a high throughput.

A "nano imprint lithography (NIL) technique" proposed by S. Y. Chou in 1995 is used to form microstructures of size equal to or smaller than the wavelength of light (see, for example, Appl. Phys. Lett.; Vol. 67 (1995) P3114).

The nano imprint lithography technique involves pressing a master on which fine concave and convex patterns have been formed using the electron beam lithography or the like, against a substrate coated with a resist, to transfer the concave and convex patterns on the master to the resist film.

This technique sharply reduces the time required to process an area of at least 1 square inch compared to the electron beam lithography or focused ion beam lithography.

The steps of nano imprint lithography are as follows.

(1) A resist such as PMMA is applied to a transferred substrate such as a silicon substrate.

(2) The master is pressed against the transferred substrate in a reduced pressure atmosphere. In this case, the pressure is about 100 atm.

(3) The transferred substrate provided with the resist film is heated to at least the glass transition temperature of the resist.

(4) A predetermined time later, the master and the transferred substrate are cooled to room temperature.

(5) The master is stripped off from the transferred substrate.

(6) Concaves and convexes are transferred to the resist film.

Of these steps, the step (3) of heating the transferred substrate to the glass transition temperature of the resist is required to soften the resist to enable the concaves and convexes to be transferred even under a low pressure. However, it takes a long time to heat and cool the transferred substrate, thus lowering throughput. Moreover, the softened resist causes the resist film to attach partly to the master and thus be stripped off from the substrate.

Further, these steps are executed in a reduced pressure atmosphere. This is to prevent transfers from being locally disabled owing to the presence of bubbles between the master and the transferred substrate. However, in forming a reduced pressure atmosphere, a long time is required for deaeration using a pump or the like. This also reduces the throughput.

Further, if the concave and convex patterns on the master are uniformly transferred to a large area of about at least 1 square inch, a high parallelism is required between the surface of the master and the surface of the transferred substrate. Even if the required parallelism is obtained, it is very difficult to uniformly distribute a load over the large area.

As described above, the nano imprint lithography technique is suitable for forming a microstructure of a size equal to or smaller than the wavelength of light. The nano imprint lithography enables a microstructure to be formed with a much higher throughput than a drawing process using the electron beam lithography or focused ion beam lithography.

However, problems with the nano imprint lithography technique are that the throughput is affected by the time required to heat and cool the substrate, that the film may be stripped, that the time required for deaeration affects the throughput, and that it is difficult to ensure the parallelism between the surface of the master and the surface of the transferred substrate and to apply a uniform load to the master and transferred substrate.

In order to solve these problems, the applicant has proposed a room temperature imprint technology (see, for example, Jpn. Pat. Appln. KOKAI Publication No. 2003-157520).

With the room temperature imprint technology, a master and a transferred substrate are sandwiched between a pair of press surfaces under room temperature; the master has a concave and convex region provided with concave and convex patterns and the transferred substrate is coated with a resist. A very high pressure is then applied to the master and transferred substrate to transfer the concave and convex patterns on the master to the resist film on the transferred substrate.

This technique allows the concave and convex formed region of the master except for blank parts to be pressed against the transferred substrate under a uniform pressure. Consequently, fine concave and convex patterns of size 200 nm or less are uniformly transferred to the transferred substrate over a large area. A high throughput is also achieved.

Further, even under atmospheric pressure, when a pressure of at least 500 atm. is applied to the master and transferred substrate, compressed bubbles serve as a protective layer. Accordingly, the master and the transferred substrate are reliably and easily separated from each other to avoid problems such as tear-off of the film.

As described above, the room temperature imprint technique eliminates the disadvantages of the "nano imprint lithography (NIL) technique" proposed by S. Y. Chou. However, the room temperature imprint technique presents the problems described below.

A first problem is that under a pressure of at least 500 atm., elastic deformation of a mold causes a biased abutment phenomenon. This precludes the master and the transferred substrate from being subjected to a uniform pressure.

FIG. 23 is a partly cutaway perspective view of a press machine used for a press process with the room temperature imprint technique.

In FIG. 23, reference numerals 101, 102, and 103 denote a master, a transferred substrate, and an upper mold, respectively. Reference numerals 104 and 105 denote an upper base and a lower mold, respectively. Reference numeral 106 denotes a lower base.

The upper base 104 has a disk-like larger-diameter portion 104a and a disk-like smaller-diameter portion 104b formed on a bottom surface of the larger-diameter portion 104a concentrically with the larger-diameter portion 104a. The upper mold 103 is shaped like a donut and is embedded in a central part of the smaller-diameter portion 104b.

The lower base 106 is composed of a disk-like larger-diameter portion 106a and a disk-like smaller-diameter portion 106b formed on a top surface of the larger-diameter portion 106a concentrically with the larger-diameter portion 106a. A cylindrical projection 106c is formed so as to extend upward through central holes in the master 101 and transferred substrate 102. The outer diameter of the projection 106c is slightly smaller than the inner diameter of a central hole in the upper mold 10. The lower mold 105 is shaped like a donut and embedded around the periphery of the projection 106c.

FIG. 24 is a graph showing the distribution of pressure generated when the master and the transferred substrate were pressurized at 1,000 atm. using the press machine used for the press process with the room temperature imprint technique.

FIG. 24 shows that there is a difference of about 20% in pressure. This indicates that the master and the transferred substrate are not subjected to a uniform pressure.

A second problem is the relative misalignment between the master and the transferred substrate.

FIG. 25A is a sectional view showing the master and transferred substrate before the press process with the room temperature imprint technique. FIG. 25B is a sectional view showing the master and transferred substrate during the press process with the room temperature imprint technique.

As previously described, with the room temperature imprint technique, the master and the transferred substrate are subjected to a high pressure of at least 500 atm. Thus, the master and the transferred substrate contract significantly in a vertical direction (in which the pressure is applied) and expand markedly in a horizontal direction (which is perpendicular to the vertical direction).

A Poisson ratio is the ratio of the amount by which the master and transferred substrate contract in the vertical direction to the amount by which the master and transferred substrate expand in the horizontal direction. Every substance has its specific Poisson ratio. The amount by which the master and the transferred substrate expand in the horizontal direction is in proportion to compressive stress and the Poisson ratio and in inverse proportion to the modulus of longitudinal elasticity.

For example, nickel has a modulus of longitudinal elasticity of $1.995 \times 10^{11}$ Pa and a Poisson ratio of 0.31. Glass has a modulus of longitudinal elasticity of $7.200 \times 10^{10}$ Pa and a Poisson ratio of 0.30.

Accordingly, if the material for the master 101 is nickel and the material for the transferred substrate 102 is glass, the master 101 and the transferred substrate 102 have significantly different moduli of longitudinal elasticity from each other. Consequently, misalignment unavoidably occurs between the master 101 and the transferred substrate 102.

Frictional force acts on the upper mold 103, the lower mold 105, the master 101, and the transferred substrate 102. Thus, with a uniform pressure distribution, the frictional force surpasses a horizontally expanding force to prevent the misalignment between the master 101 and the transferred substrate 102. However, as previously described, the room temperature imprint technique entails a nonuniform pressure distribution. This results in the misalignment between the master 101 and the transferred substrate 102.

FIG. 26 is a graph showing the amount of relative misalignment between the master and the transferred substrate observed if the room temperature imprint technique is used. In FIG. 26, a denotes the amount of misalignment attributed to the room temperature imprint technique, and b denotes a line corresponding to a misalignment amount of zero.

FIG. 26 shows that the amount of misalignment between the master and the transferred substrate is about 20 nm. This misalignment amount is impermissible if patterns of a size of at most 200 nm are to be formed.

It is an object of the present invention to solve problems (1) to (5) listed below and accompanying the nano imprint lithography technique as well as problems (7) to (6) listed below and accompanying the room temperature imprint technique.

(1) A long time is required to heat and cool the substrate, thus lowering the throughput.

(2) When the master is stripped off from the transferred substrate, the resist film may be stripped off from the transferred substrate.

(3) A long time is required deaeration, thus lowering the throughput.

(4) It is difficult to ensure the parallelism between the surface of the master and the surface of the transferred substrate and to apply a uniform pressure to the master and transferred substrate.

(5) During heating or cooling, a difference in coefficient of thermal expansion may result in the relative misalignment between the master and the transferred substrate.

(6) A nonuniform pressure is exerted on the transferred substrate.

(7) A difference in material may lead to the relative misalignment between the master and the transferred substrate.

BRIEF SUMMARY OF THE INVENTION

According to an aspect of the present invention, a method for manufacturing a plate-like structure is configured as described below.

The aspect of the present invention provides a method for manufacturing a plate-like structure, the method comprising a step of transferring concave and convex patterns on a master to a surface of a transferred substrate by sandwiching the master provided with the concave and convex patterns and the transferred substrate, between a press surface of a hollow cylindrical upper mold and a press surface of a hollow cylindrical lower mold, and pressurizing central parts of the upper and lower molds to apply pressure to the master and the transferred substrate, wherein a compressive load imposed on inner peripheral portions of the upper and lower molds is blocked and distributed toward outer peripheries of the upper and lower molds.

According to another aspect of the present invention, a method for manufacturing a plate-like structure is configured as described below.

The aspect of the present invention provides a method for manufacturing a plate-like structure, the method comprising a step of transferring concave and convex patterns on a master to a surface of a transferred substrate by sandwiching the master provided with the concave and convex patterns and the transferred substrate, between a press surface of an upper mold and a press surface of a lower mold, and applying pressure to the master and the transferred substrate, wherein a compressive load imposed on outer peripheral portions of the upper and lower molds is distributed toward central axes of the upper and lower molds.

According to another aspect of the present invention, an apparatus which manufactures a plate-like structure is configured as described below.

The aspect of the present invention provides an apparatus which manufactures a plate-like structure, the apparatus transferring concave and convex patterns on a master to a surface of a transferred substrate by sandwiching the master provided with the concave and convex patterns and the transferred substrate, between a press surface of a hollow cylindrical upper mold and a press surface of a hollow cylindrical lower mold, and applying pressure to the master and the transferred substrate, wherein the apparatus comprises grooves formed in inner peripheral surfaces of the upper and lower molds to block a compressive load concentrating at inner peripheral portions of the upper and lower molds to distribute the compressive load toward outer peripheries of the upper and lower molds.

According to another aspect of the present invention, an apparatus which manufactures a plate-like structure is configured as described below.

The aspect of the present invention provides an apparatus which manufactures a plate-like structure, the apparatus transferring concave and convex patterns on a master to a surface of a transferred substrate by sandwiching the master provided with the concave and convex patterns and the transferred substrate, between a press surface of an upper mold and a press surface of a lower mold, and applying pressure to the master and the transferred substrate, wherein the apparatus comprises grooves formed in outer peripheral surfaces of the upper and lower molds to distribute a compressive load concentrating at outer peripheral portions of the upper and lower molds toward central axes of the upper and lower molds.

The present invention enables the high-throughput and high-yield manufacturing of high-density recording media, semiconductors, and magnetic recording media having fine concave and convex patterns.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 13 is a sectional view of a manufacturing apparatus according to a fourth embodiment of the present invention;

FIG. 14 is a sectional view showing an essential part of a transferred substrate 1 pressurized by an upper and lower molds according to a fifth embodiment of the present invention;

FIG. 15A is a graph showing the distribution of pressure generated between a master and a transferred substrate according to the fifth embodiment;

FIG. 15B is a graph showing the amount of relative misalignment between the master and the transferred substrate according to the fifth embodiment;

FIG. 19A is a graph showing the distribution of pressure generated between a master and a transferred substrate according to the fifth embodiment;

FIG. 19B is a graph showing the amount of relative misalignment between the master and the transferred substrate according to the fifth embodiment;

FIG. 20A is a sectional view of a pressure equalizer in which no pressure is applied to the master and transferred substrate according to the fifth embodiment;

FIG. 20B is a sectional view of a pressure equalizer in which pressure is applied to the master and transferred substrate according to the fifth embodiment;

FIG. 21A is a graph showing the distribution of pressure generated between the master and the transferred substrate if a manufacturing apparatus according to a variation of the fifth embodiment is used;

FIG. 21B is a graph showing the amount of relative misalignment between the master and the transferred substrate if a manufacturing apparatus according to a variation of the fifth embodiment is used;

FIG. 24 is a graph showing the distribution of pressure generated when the master and the transferred substrate are pressurized under a pressure of 1,000 atm using the press machine utilized for the press process with the room temperature imprint technique;

FIG. 25A is a sectional view showing the master and the transferred substrate before the press process with the room temperature imprint technique;

FIG. 25B is a sectional view showing the master and the transferred substrate during the press process with the room temperature imprint technique.

DETAILED DESCRIPTION OF THE INVENTION

A first to fifth embodiments of the present invention will be described below in detail with reference to the drawings.

First Embodiment

In the first embodiment, a groove region is formed on a substrate using nano imprinting according to the present invention. A magnetic material is filled into the groove region to create a recording track band. In this case, a plate-like structure is assumed to be a magnetic disk contained in a 2.5-inch hard disk.

FIGS. 1A to 1F are process diagrams of a process for manufacturing magnetic recording media (plate-like structure) according to the first embodiment of the present invention. FIGS. 1A to 1F are also schematic sectional views of a workpiece during the respective steps.

Figure 1A:
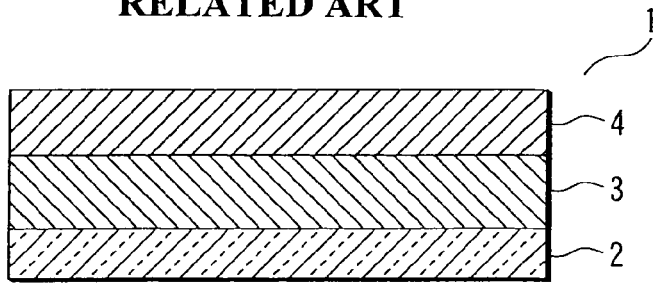
FIG. 1A is a process diagram of a process for manufacturing magnetic recording media according to a first embodiment of the present invention.

A transferred substrate 1 shown in FIG. 1A is produced. Specifically, a soft magnetic layer and a vertical-recording magnetic film are deposited on a glass disk substrate 2 by a sputtering method; the soft magnetic layer consists of a ruthenium alloy and the magnetic film comprises a recording layer consisting of a cobalt alloy. The glass disk substrate 2 used is shaped like a hollow disk of a diameter of 65 mm having a hollow portion formed along a central axis. In the description below, a "magnetic film 3" indicates the soft magnetic layer and the magnetic film. A novolack type resist film 4 is deposited on the magnetic film 3 to a thickness of 100 nm by spin coating.

Figure 1B:
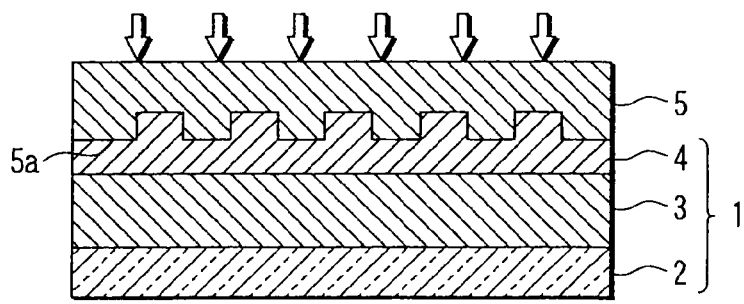
FIG. 1B is a process diagram of the process for manufacturing magnetic recording media according to the first embodiment.

Then, as shown in FIG. 1B, a master 5 is pressed against the resist film 4 to transfer concave and convex patterns on the master 5 to a surface of the resist film 4. As described later, the master 5 comprises a concave and convex formed region 5a provided with a plurality of concave and convex patterns. This process is nano imprinting.

Figure 1C:
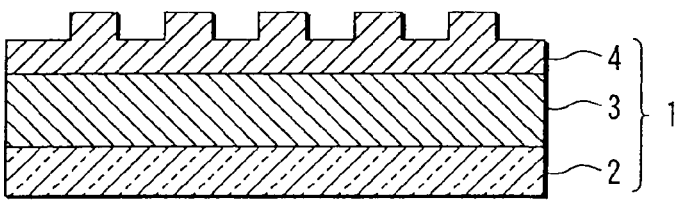
FIG. 1C is a process diagram of the process for manufacturing magnetic recording media according to the first embodiment.

Then, as shown in FIG. 1C, the master 5 is stripped off from the transferred substrate 1. Thus, when nano imprinting is finished, the concave and convex patterns corresponding to the concave and convex patterns on the master 5 have been formed on the surface of the resist film 4 on the transferred substrate 1.

Figure 1D:
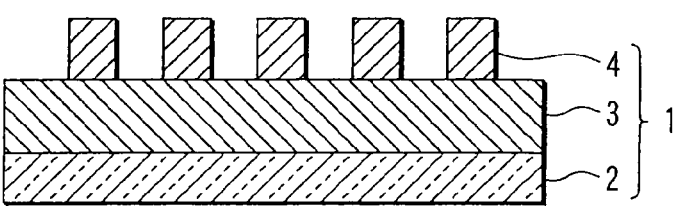
FIG. 1D is a process diagram of the process for manufacturing magnetic recording media according to the first embodiment.

Then, as shown in FIG. 1D, the residues of the resist film 4 are removed by etching (RIE).

Figure 1E:
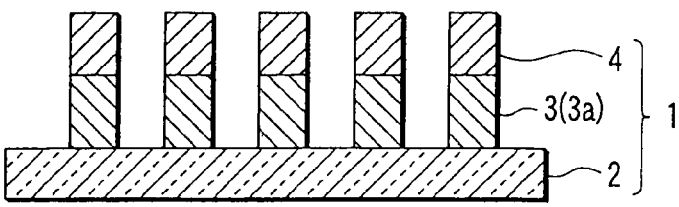
FIG. 1E is a process diagram of the process for manufacturing magnetic recording media according to the first embodiment.

Then, as shown in FIG. 1E, an argon ion milling process is executed on the resist film 4 and magnetic film 3 in the transferred substrate 1 to etch the magnetic film 3. On this occasion, the milling process removes the magnetic film 3 from the part of the resist film 4 which corresponds to the groove. The milling process etches a part of the whole resist film 4 except for the groove. However, the etching does not reach the magnetic film 3. Consequently, the patterned magnetic substance 3a remains.

Figure 1F:
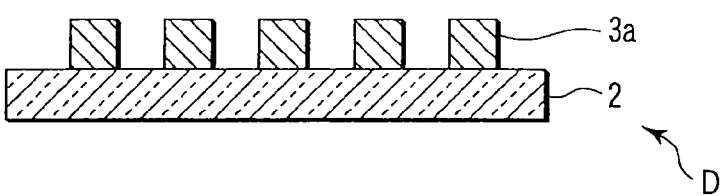
FIG. 1F is a process diagram of the process for manufacturing magnetic recording media according to the first embodiment.

As shown in FIG. 1F, an oxygen ashing process is executed on the workpiece thus obtained to remove the residual resist. Thus, a recording track band comprising a patterning magnetic substance 3a is formed on the glass disk substrate 2. Disk-like recording media D is completed.

A material for the transferred substrate 1 is desirably suitable for high-density recording media to be produced. For example, the substrate material contains a metal, alloy, metal oxide, an inorganic material, a ceramic material, a semiconductor, glass, or a compound or mixture containing at least two of these materials.

A material for the resist film 4 is desirably suitable for a process such as etching which is executed after the nano imprint process depending on the high-density recording media to be produced. The material is, for example, a common resist material or polymer material used for a semiconductor process.

Moreover, the resist film 4 must have the concave and convex patterns on the master 5 reliably transferred to itself by nano imprinting. Thus, the resist material is desirably softer than the material for the master 5.

Further, the resist material is preferably stable so that the concave and convex patters transferred at room temperature are maintained after the nano imprint process. That is, the resist material desirably has a glass transition temperature and a melting point which are both equal to or higher than the room temperature. Moreover, the resist material is desirably soft enough to allow the concave and convex patterns on the master 5 to be transferred to itself even with a load of at least 500 atm.

The master 5 is produced as described below.

First, electron beam lithography is used to form a large number of groove structures with various shapes on a glass master. These groove structures have a width of at most 200 nm, a spacing of at most 200 nm, and a height of at most 200 nm.

Then, a plating method is used to form a nickel film of a thickness 300 μm on a surface of the glass master. Subsequently, the nickel film is stripped off from the glass master and cut. This forms concentric concave and convex patterns having a width of at most 200 nm, a spacing of at most 200 nm, and a height of at most 200 nm. A nickel master 5 of a diameter of 65 mm and a thickness of 300 μm is completed.

The material for the master 5 is desirably chosen such that the concave and convex patterns formed on the surface of the master 5 are unlikely to be deformed during nano imprinting. The material is, for example, a metal, an alloy, a metal oxide, an inorganic material, a ceramic material, a semiconductor, glass, or a compound or mixture containing at least two of these materials.

Further, the master 5 is desirably deformed to follow an accidental swell in the surface of the transferred substrate 1. That is, the master 5 is desirably formed of a material softer than that for the upper mold 9 and lower mold 10. The inventor's examinations demonstrate that good results are obtained by using nickel (Ni), aluminum (Al), or the like as a material for the master 5. It has also been found that good results are obtained when the master 5 has a thickness of about 300 μm.

The concave and convex patterns formed in the concave and convex formed region 5a of the master 5 have a structure that is at most 200 nm in size so as to be suitably used for production of high-density recording media. Examples of this structure include a groove structure of a width of at most 200 nm, a ridge structure of a width of at most 200 nm, a dot structure of a diameter of at most 200 nm, a columnar structure of a diameter of at most 200 nm, and a hole-like structure of a diameter of at most 200 nm.

The depth of the concave and convex patterns is preferably at most 200 nm, which is suitable for a semiconductor process such as etching which is executed after the nano imprint process. Further, a groove part of the concave and convex patterns are desirably tapered at an angle of 1 to 60° so as to be fanned toward the transferred substrate 1 so that the transferred substrate 1 is easily stripped off from the master 5 after the nano imprint process. Moreover, the top and bottom of the concave and convex patterns have a flat structure of roughness at most 10 nm so as to allow a magnetic substance to be accurately formed.

Now, description will be given of a nano imprinting method and a manufacturing apparatus.

Figure 2:
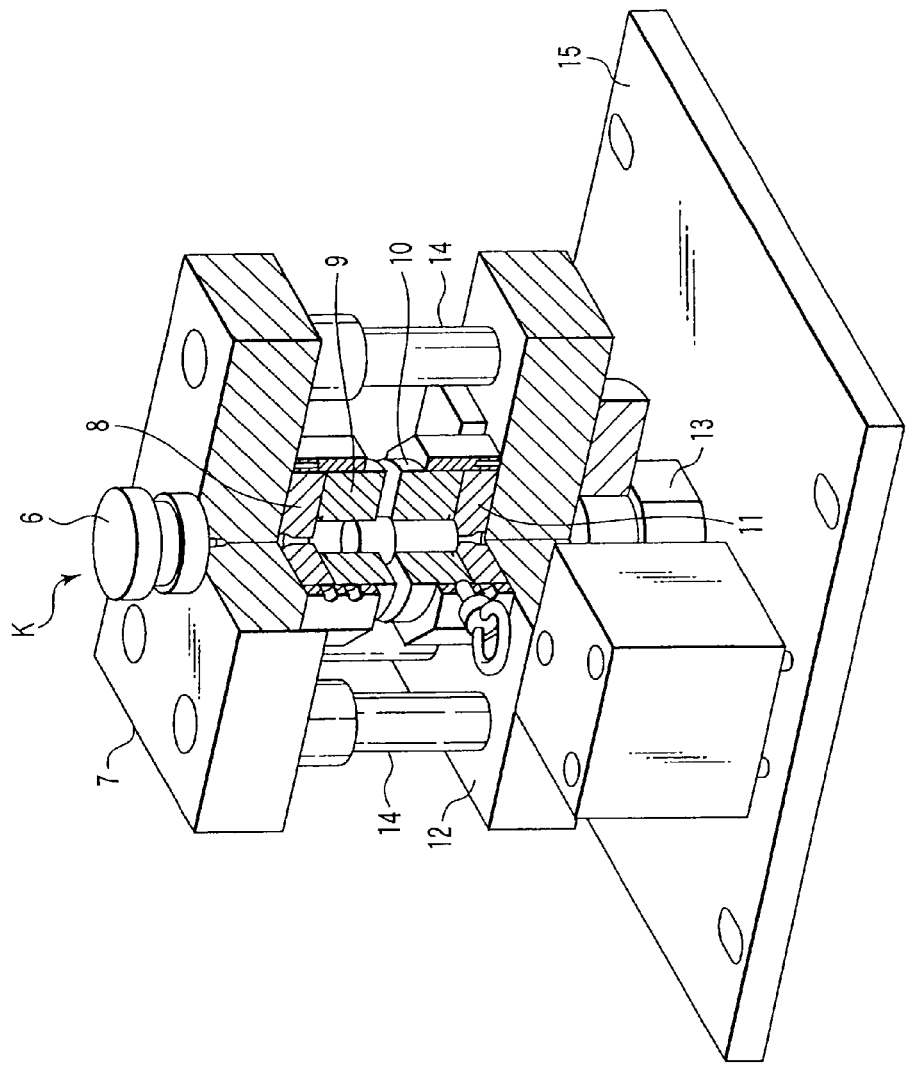
FIG. 2 is a perspective view of a manufacturing apparatus according to the first embodiment.
Figure 3:
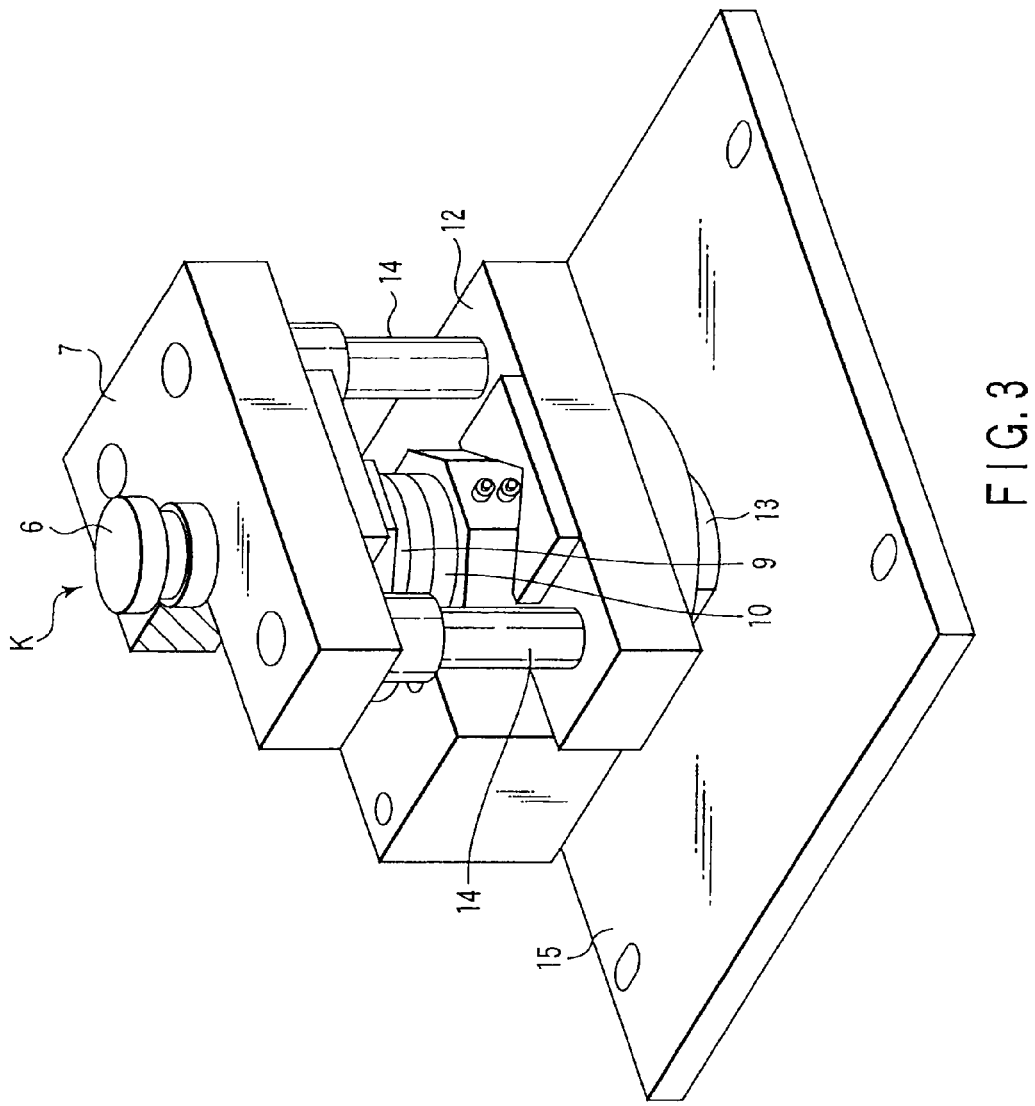
FIG. 3 is a perspective view of the manufacturing apparatus according to the first embodiment as viewed from a direction different from that in FIG. 2.
Figure 4:
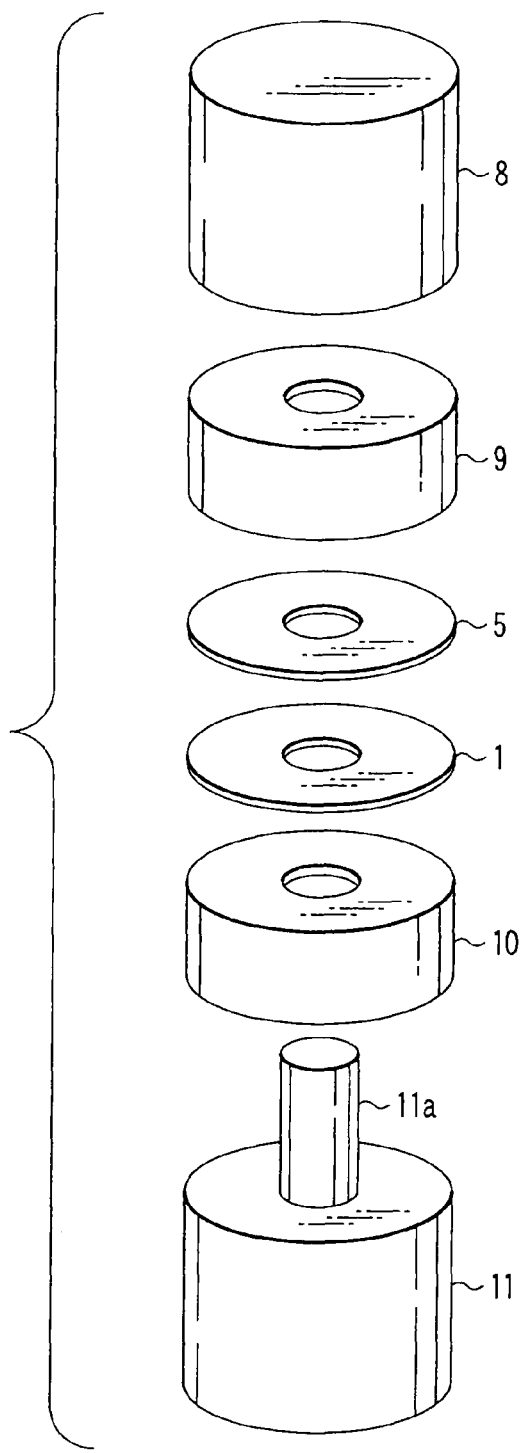
FIG. 4 is an exploded perspective view of an essential part of the manufacturing apparatus according to the first embodiment.

FIG. 2 is a perspective view of a manufacturing apparatus according to the first embodiment. FIG. 3 is a perspective view of the manufacturing apparatus according to the first embodiment as viewed from a direction different from that in FIG. 2. FIG. 4 is an exploded perspective view of an essential part of the manufacturing apparatus according to the first embodiment.

As shown in FIGS. 2 to 4, the manufacturing apparatus comprises a free shank 6, an upper die set 7, an upper plate 8, an upper mold 9, a lower mold 10, a lower plate 11, a lower die set 12, and a projection 13. The manufacturing apparatus is pressurized from above by a hydraulic press machine. The position of the master 5 can be replaced with the position of the transferred substrate 1.

The upper die set 7 is combined with the lower die set 12 via a plurality of guide posts 14 so that the upper die set 7 can freely contact and leave the lower die set 12. The upper plate 8 is mounted on a bottom surface of the upper die set 7. The upper mold 9 is supported on a bottom surface of the upper plate 8. The lower plate 11 is mounted on a top surface of the lower die set 12. The lower mold 10 is supported on a top surface of the lower plate 11.

The projection 13 is provided on a top surface of a base 15 fixed to the hydraulic press machine to support a central part of bottom surface of the lower die set 12. A top surface of the projection 13 has a diameter smaller than that of the work piece (master 5 and transferred substrate 1).

A pair of press surfaces according to the present invention is composed of a bottom surface of the upper mold 9 and a top surface of the lower mold 10. The master 5 and the transferred substrate 1 are sandwiched and pressurized between the press surfaces.

Figure 5:
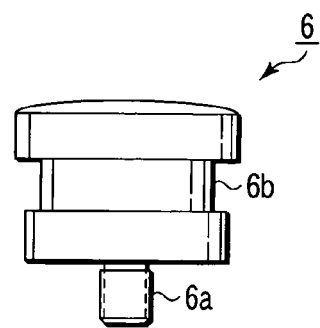
FIG. 5 is an enlarged view of a free shank according to the first embodiment.

FIG. 5 is an enlarged view of the free shank 6 according to the first embodiment.

As shown in FIG. 5, the free shank 6 is almost cylindrical and is mainly composed of an upper part, an intermediate part, and a lower part. The top surface of the upper part is spherical. A groove 6b is formed in the intermediate part all along the circumference of the free shank 6. A shaft portion 6a projects perpendicularly from a central part of bottom surface of the lower part. The shaft portion 6a is threaded in its outer peripheral part. The shaft portion 6a is screwed into a screw hole formed in the top surface of the upper die set 7. Thus, the free shank 6 is fixed to the upper die set 7.

The bottom surface of the free shank 6 has a diameter smaller than that of the workpiece; the top surface of the free shank 6 contacts the top surface of the upper die set 7.

Figure 6:
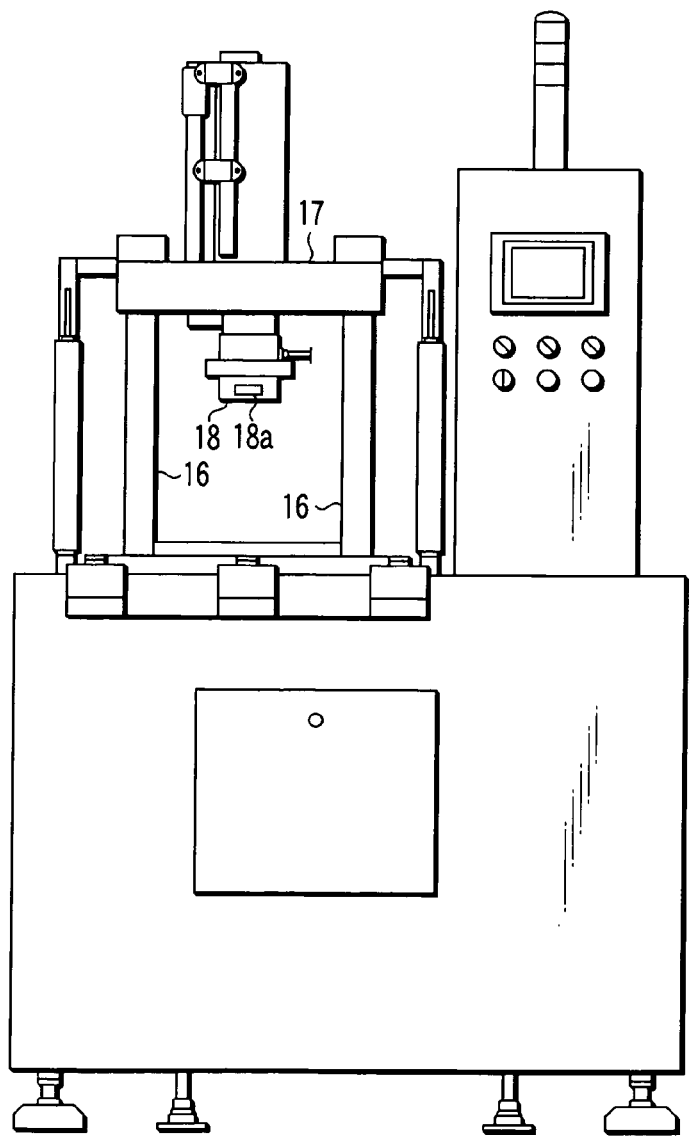
FIG. 6 is a front view of a common hydraulic press machine used to press the manufacturing apparatus according to the first embodiment.

FIG. 6 is a front view of a common hydraulic press machine used to press the manufacturing apparatus according to the first embodiment.

In operation, the above manufacturing apparatus is mounted in a common hydraulic press machine such as the one shown in FIG. 6. The hydraulic press machine comprises a plurality of guide bars 16 provided on the left and right of the position at which the manufacturing apparatus is mounted, a stage 17 moved up and down by guiding it along the guide bars 16, and a holder 18 attached to a bottom surface of the stage 17.

The upper part of the free shank 6 is inserted into a hole 18a formed in the holder 18. This allows the manufacturing apparatus to be installed on the holder 18. The free shank 6 is held by the holder 18 so as to be rotatable around a central axis.

When the central part of top surface of the free shank 6 is pressed downward by the holder 18, the projection 13 of the manufacturing apparatus receives this force. This causes the pressure to be transmitted to the workpiece sandwiched between the upper mold 9 and the lower mold 10.

Now, description will be given of pressure applied by the upper mold 9 and lower mold 10 during nano imprinting.

In the present embodiment, nano imprinting is executed under atmospheric pressure. The pressure during nano imprinting is set to at least 500 atm. This eliminates the need to increase the temperature during nano imprinting to at least the glass transition temperature of the resist film 4. Consequently, the concave and convex patterns on the master 5 are transferred to the transferred substrate even at room temperature or even at 80° or lower even if heating is executed. This eliminates or drastically reduces the time required to heat and cool the master 5 and the transferred substrate 1. As a result, the throughput is greatly improved.

Moreover, when the pressure during nano imprinting is set to at least 500 atm, bubbles remaining between the master 5 and the transferred substrate 1 are compressed so that their size is reduced to at most 1/500. This substantially eliminates a mistake in the transfer of the concave and convex patterns caused by the bubbles.

Further, when the master 5 is stripped off from the transferred substrate 1, the bubbles compressed during nano imprinting attempt to return to their original volume. The master 5 is thus pushed so as to separate from the transferred substrate 1. This prevents the resist film 4 from attaching to and remaining on the master 5. That is, the bubbles compressed under a high pressure are interposed between the master 5 and the transferred substrate 1; the bubbles serve as a protective layer which is thin but which avoids impairing the concave and convex patterns, to suppress tear-off of the resist film 4.

The press surfaces of the upper mold 9 and lower mold 10 are desirably very flat. Specifically, the press surfaces preferably have a surface roughness of less than 10 µm and more preferably less than 1 µm in the vicinity of the master 5 and transferred substrate 1, on which nano imprinting is executed.

There is preferably a high parallelism between the press surfaces of the upper mold 9 and lower mold 10. Specifically, when the manufacturing apparatus is pushed without sandwiching the master 5 and the transferred substrate 1, the gap created between the press surfaces of the upper mold 9 and lower mold 10 is preferably less than 10 µm and more preferably 1 µm. Provided that the press surfaces of the upper mold 9 and lower mold 10 meet these conditions, problems can be prevented which originate from the biased abutment between the upper mold 9 and the lower mold 10.

Possible materials for the upper mold 9 and lower mold 10 include low carbon steel, stainless steel, aluminum alloy, cemented carbide, or the like, in view of their availability, cost, and the like.

Now, description will be given of a method for pushing the master 5 against the transferred substrate 1 under a uniform pressure.

Figure 7:
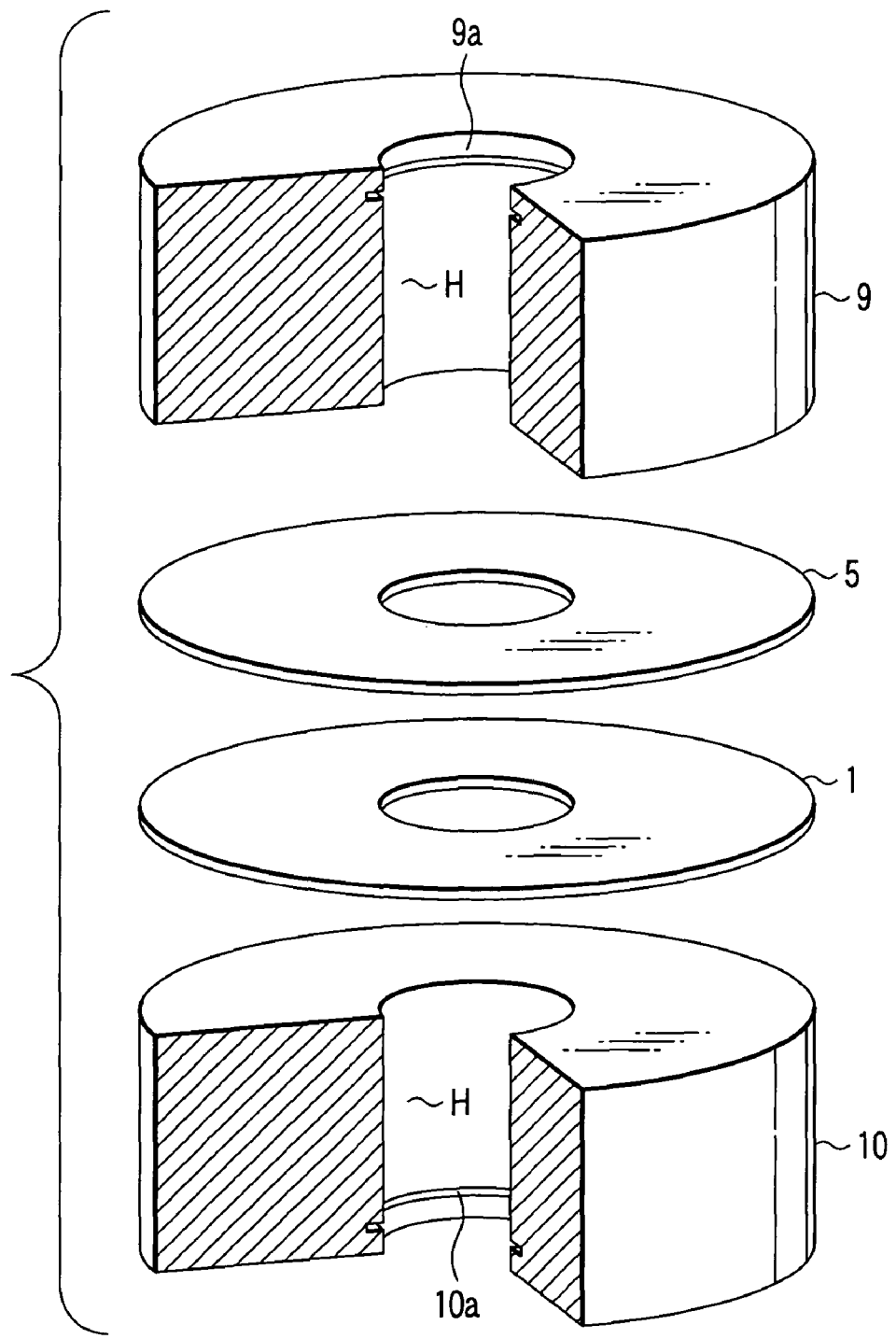
FIG. 7 is an exploded perspective view of a mold used to produce a 2.5-inch hard disk according to the first embodiment.

FIG. 7 is an exploded perspective view of a mold used to produce a 2.5-inch hard disk according to the first embodiment.

As shown in FIG. 7, grooves 9a and 10a are formed in inner peripheral surfaces of the upper mold 9 and lower mold 10 along a circumferential direction respectively.

Figure 8:
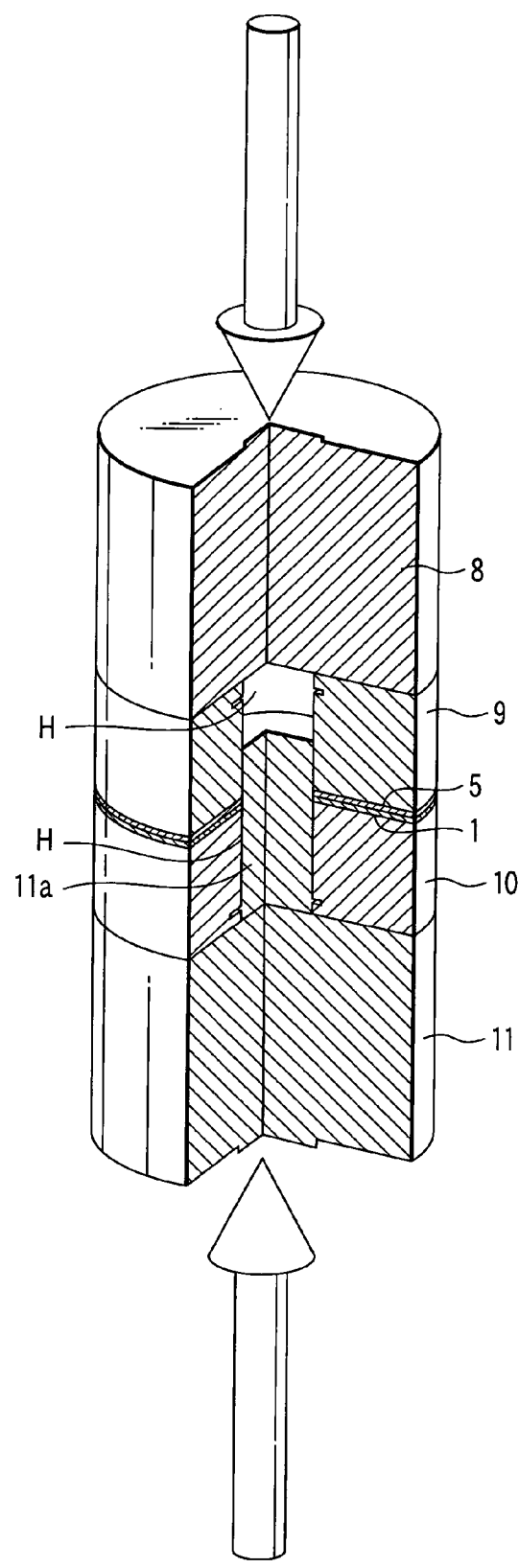
FIG. 8 is a diagram illustrating a method for applying pressure to the mold according to the first embodiment.

FIG. 8 is a diagram illustrating a method for applying a pressure to the mold according to the first embodiment.

As shown arrows in FIG. 8, pressure is applied so as to concentrate at the central part between the upper mold 9 and the lower mold 10.

Now, description will be given of the characteristics of the structure of the mold according to the present embodiment.

Each of the upper mold 9 and lower mold 10 is formed like a cylinder having an outer diameter of 65 mm, an inner diameter of 20 mm, and a thickness of 25 mm. A groove 10a of a height of 1 mm and a depth of 1.8 mm is formed in the inner peripheral surface of the lower mold 10 at a position 2 mm away from the bottom surface of the lower mold 10. A groove 9a of a height of 1 mm and a depth of 1.8 mm is formed in the inner peripheral surface of the upper mold 9 at a position 2 mm away from the top surface of the upper mold 9. Low-carbon steel or stainless steel is used as a material for the upper mold 9 and lower mold 10.

The hollow portions of the master 5, transferred substrate 1, upper mold 9, and lower mold 10 are formed so as to determine their relative positions. The pin 11a of the lower plate 11 is inserted through the hollow portions. The hollow portions of the master 5, transferred substrate 1, upper mold 9, and lower mold 10 should have a diameter that is the same as the outer diameter of the pin 11a. However, the diameter of the pin 11a is set slightly larger than that of the hollow portions (that is, by 5 to 20 µm) so as to allow the master 5, transferred substrate 1, upper mold 9, and lower mold 10 to be smoothly fitted around and removed from the pin 11a. This creates a gap between the inner peripheral surface of each of the master 5, transferred substrate 1, upper mold 9, and lower mold 10 and the outer peripheral surface of the pin 11a of the lower plate 11.

Further, the outer diameter of the upper mold 9 and lower mold 10 is set slightly smaller than that of the master 5 or transferred substrate 1. For example, if the gap is 10 µm in size, the outer diameter of the upper mold 9 and lower mold 10 is set smaller than that of the master 5 or transferred-substrate 1 by 10 µm plus a margin to allow for manufacturing error in hole position. This prevents the local concentration of stress.

The upper mold 9 and the lower mold 10 are attached to the hydraulic press machine via the free shank 6. A pressure concentrating mechanism (pressure concentrating means) K allows the pressure exerted by the hydraulic press machine to concentrate at the corner of the upper mold 9 and lower mold 10; the pressure concentrating mechanism consists of the free shank 6 and the projection 13. The pressure concentrating mechanism K is shown in FIGS. 2 and 3.

Now, description will be given of the reason why the grooves 9a and 10a are formed in the upper mold 9 and lower mold 10 respectively.

Figure 9A:
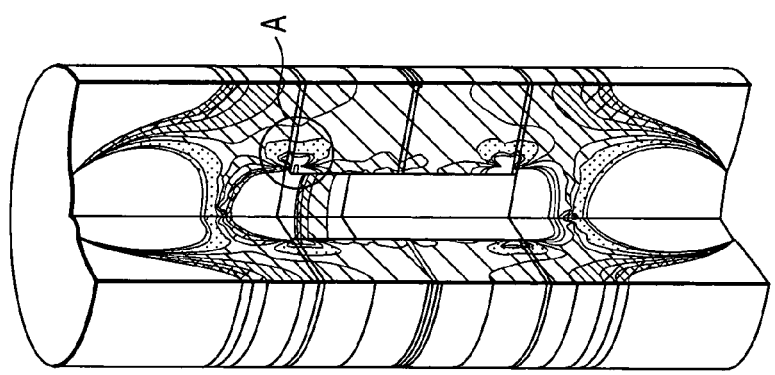
FIG. 9A is a diagram showing the distribution of stress acting on the manufacturing apparatus according to the first embodiment in a vertical direction.
Figure 9A:
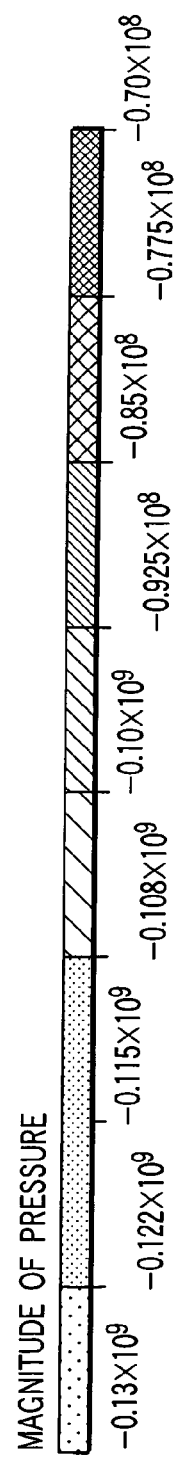
Figure 9B:
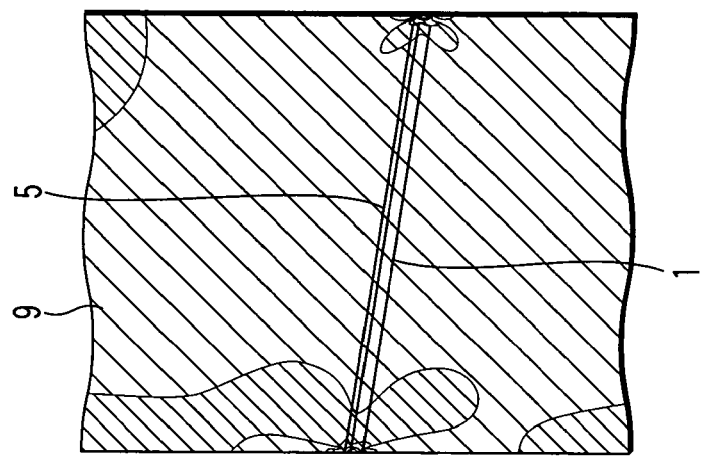
FIG. 9B is an enlarged view of an essential part of FIG. 9A.
Figure 9B:
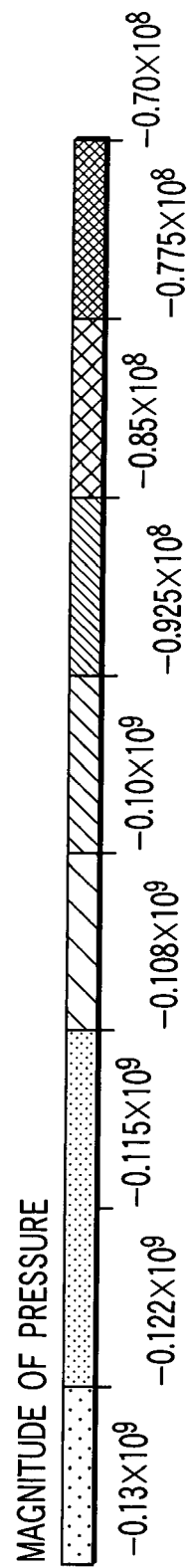

FIG. 9A is a diagram showing the distribution of stress acting on the manufacturing apparatus according to the first embodiment in the vertical direction. FIG. 9B is an enlarged view of an essential part of FIG. 9A.

In this case, a pressure of $10^8$ Pa (about 1,000 atm.) is assumed.

As shown in FIG. 9A, a substantially uniform stress acts on the master 5 and transferred substrate 1. This indicates that the master 5 and the transferred substrate are subjected to the substantially uniform pressure.

The pressure concentrating mechanism K causes the pressure from the hydraulic press machine to concentrate at the center of the upper die set 7 and lower die set 12; the pressure concentrating mechanism K is composed of the free shank 6 and the projection 13. Thus, in the upper mold 9, a compressive load concentrates at the inner peripheral part (see a part A), that is, the hollow portion H.

Accordingly, without the groove 9a, the compressive load also concentrates at the inner peripheral part of the transferred substrate 1. The contact pressure between the master 5 and the transferred substrate 1 is higher on the inner peripheral side. However, in the present embodiment, the groove 9a is formed in the part A. Thus, the force concentrating at the inner peripheral part of the upper mold 9 is blocked by the groove 9a and distributed to the outer periphery of the upper mold 9. The appropriate position and depth of the groove allow the pressure between the master 1 and the transferred substrate 1 to be substantially uniformly distributed. The effect of the groove 10a, formed in the lower mold 10, is similar to that of the groove 9a in the upper mold 9 and is thus omitted.

Figure 10:
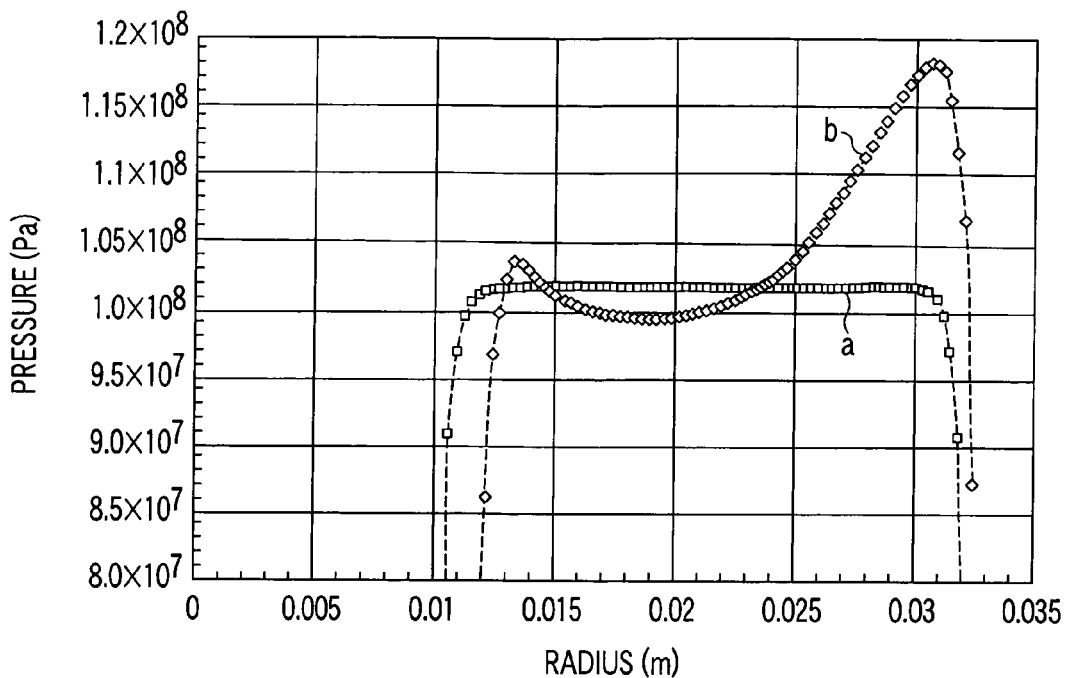
FIG. 10 is a graph showing the distribution of pressure generated between a master and a transferred substrate according to the first embodiment.

FIG. 10 is a graph showing the distribution of pressure generated between the master 5 and the transferred substrate 1 according to the first embodiment. In FIG. 10, a denotes the pressure distribution according to the present invention, whereas b denotes the pressure distribution according to the prior art.

As shown in FIG. 10, the technique according to the present invention results in a pressure difference of about 1% in the entire area except for the peripheral part. On the other hand, the prior art results in a pressure difference of about 20% in the entire area except for the peripheral part.

Figure 11:
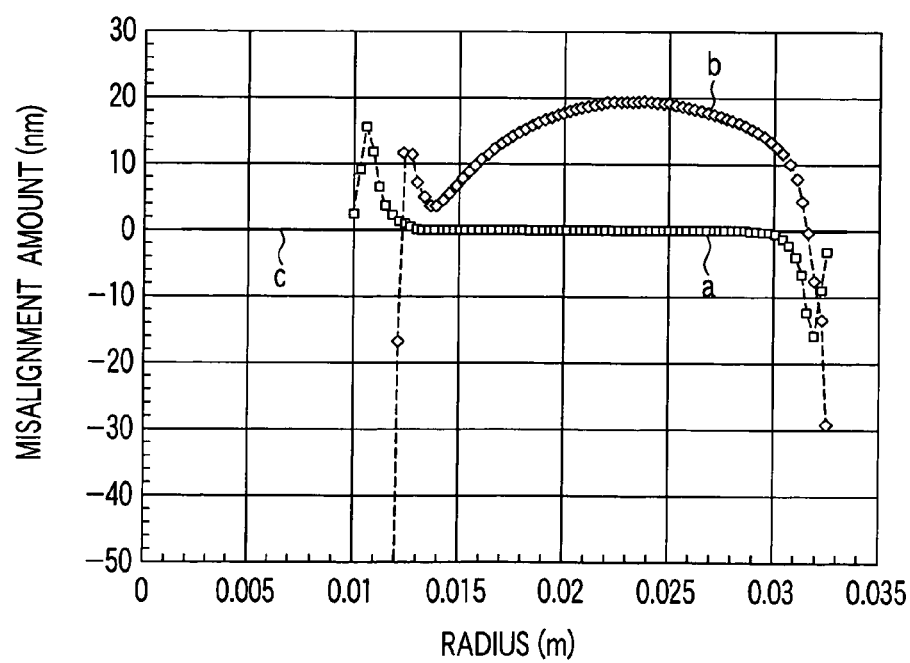
FIG. 11 is a graph showing the amount of relative misalignment between the master and the transferred substrate according to the first embodiment.

FIG. 11 is a graph showing the amount of relative misalignment between the master 5 and the transferred substrate according to the first embodiment. In FIG. 11, a denotes the amount of misalignment according to the present invention, b denotes the amount of misalignment according to the prior art, and c denotes a line corresponding to a misalignment amount of zero.

FIG. 11 indicates that a uniform pressure distribution leads to a misalignment amount of at most 1 nm. Thus, the present invention almost zeroes the misalignment amount to enable the formation of patterns of a size of about 10 nm.

Now, description will be given of the reason for and the effect of concentration of pressure at the center of the mold.

When planes of the mold transmit and receive pressure, their possible contact states are as follows. (1) The planes contact each other at their ends so that pressure is transmitted and received at the ends of the planes. (2) The planes contact each other at their centers so that pressure is transmitted and received at the centers of the planes. (3) The pressure is distributed all over the planes. (4) A small contaminant is present between the planes and the pressure concentrates at the contaminant for transmission and reception.

However, it is very difficult to visually determine which of the four contact states (1) to (4) exists. Further, the contact state depends on the structure of the press machine. Therefore, if the pressure is transmitted and received through the contact between the planes, the distribution of pressure is unstable.

However, the instability is eliminated by the concentration of pressure at the center of the mold. In the present invention, the pressure concentrating mechanism K causes the pressure to concentrate at the hollow portion H of the mold, that is, the inner periphery of the mold; the pressure concentrating mechanism K is composed of the free shank 6 and the projection 13.

The disk-like recording media produced using the manufacturing apparatus is fixed to an air spindle motor on the basis of a positioning pattern transferred during nano imprinting. The recording media and the air spindle motor are formed into a magnetic recording apparatus through a normal process for manufacturing a HDD (Hard Disk Drive).

A magnetic head in HDD reliably scans a data signal recorded region in accordance with servo signals recorded in a servo signal recorded region in a recording track band in the recording media. Thus, recording and reproducing of the information are executed.

According to the present invention, a magnetic recording layer is reliably and easily formed substantially all over the surface of a 2.5-inch disk substrate that is a plate-like structure; the magnetic recording layer is patterned at a pitch of at most 200 nm. This provides an ultra high-density magnetic recording system and forms servo patterns. In the present embodiment, the 2.5-inch disk substrate is used as a plate-like structure. However, the present invention is not limited to this.

As described above, according to the present invention, fine concave and convex patterns of a size of at most 200 nm are precisely produced in a large area of at least 1 square inch with a high throughput using the nano imprint technique.

In the above embodiment, the glass substrate is used as a plate-like structure serving as a transferred substrate. However, the transferred substrate is not limited to this. The present method is applicable to all the plate-like members on which fine patters are to be formed. The present method is also applicable to, for example, a semiconductor wafer consisting of a semiconductor material. To form an electronic circuit on the surface of a semiconductor wafer, a method for pattern forming called PEP is conventionally used which method is a combination of an exposure step, a washing step, and an etching step. By applying the present method to a semiconductor wafer on which a resist has been spin-coated, it is possible to form resist patterns with fine shapes on the surface of the semiconductor wafer without the need for the exposure step. This eliminates the need to use an expensive exposure apparatus having a complicated configuration. Further, fine patterns can be formed without the need to take limits on light diffraction into account. This allows high-density recording media or semiconductors having a similar microstructure to be manufactured with a high throughput and a high yield.

Second Embodiment

In the second embodiment, description will be given of a trial example of phase change optical recording media such as MD.

FIGS. 12A to 12F are process diagrams of a process for manufacturing phase change optical recording media according to the second embodiment of the present invention; these figures show sectional views of a workpiece during the respective steps.

Figure 12A:
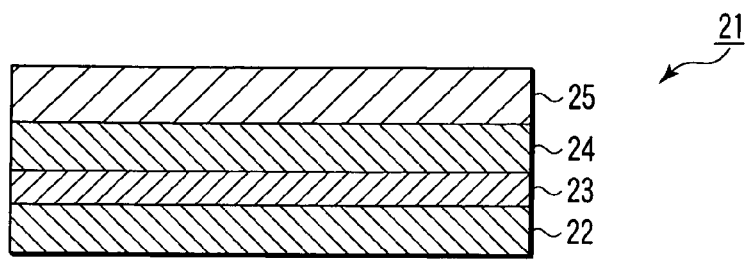
FIG. 12A is a process diagram of a process for manufacturing phase change optical recording media according to a second embodiment of the present invention.

First, a transferred substrate 21 shown in FIG. 12A is produced. Specifically, a reflection film 23 and a matrix layer 24 are deposited on a glass disk substrate 22 of a diameter of 2.5 inches; the reflection film 23 consists of a platinum (Pt) film of a thickness of about 30 nm and the matrix layer 24 consists of an aluminum ($Al_2O_3$) film of a thickness of about 50 nm. Then, a resist is applied to the matrix layer 24 by the spin coat method to deposit a resist film 25.

Figure 12B:
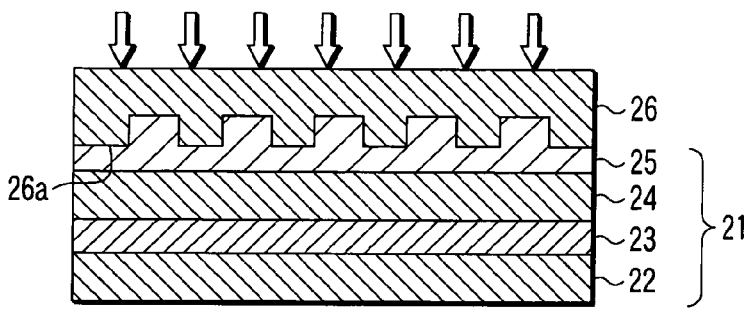
FIG. 12B is a process diagram of the process for manufacturing phase change optical recording media according to the second embodiment.

Then, as shown in FIG. 12B, the same method as that used in the first embodiment is used to transfer concave and convex patterns on a master 26 to a surface of the resist film 25. This step is nano imprinting. The master 26 used is produced using a process similar to that in the first embodiment. However, the master 25 is 65 nm in diameter and 300 µm in thickness and has a concave and convex formed region 26a on its surface; concentric concave and convex patterns of a width of 50 nm, a spacing of 50 nm, and a height of 100 nm are formed in the concave and convex formed region 26a.

Figure 12C:
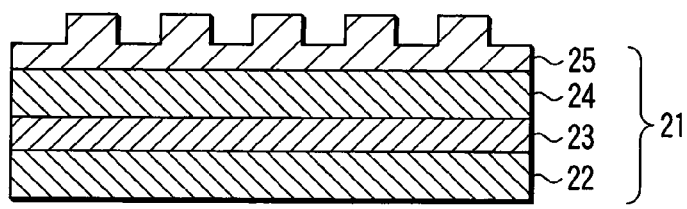
FIG. 12C is a process diagram of the process for manufacturing phase change optical recording media according to the second embodiment.

Then, as shown in FIG. 12C, the transferred substrate 21 is stripped off from the master 26. When nano imprinting is finished, the concentric concave and convex patterns corresponding to the concave and convex patterns on the master 26 have been formed on the surface of the resist film 25 in the transferred substrate 21; the concentric concave and convex patterns have a width of 50 nm, a spacing of 50 nm, and a height of 100 nm.

Figure 12D:
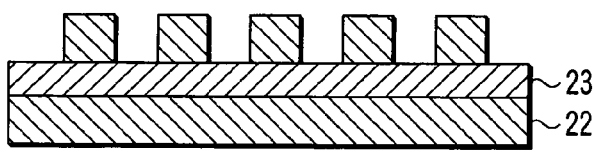
FIG. 12D is a process diagram of the process for manufacturing phase change optical recording media according to the second embodiment.

Then, as shown in FIG. 12D, the matrix layer 24 is etched using the resist patterns as a mask. This forms a groove structure in the matrix layer 24. The resist film 25 is removed after the etching.

Figure 12E:
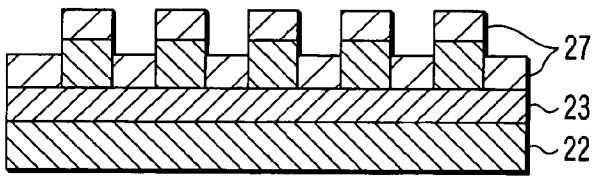
FIG. 12E is a process diagram of the process for manufacturing phase change optical recording media according to the second embodiment.

Then, as shown in FIG. 12E, an indium antimony tellurium (In—Sb—Te) film 27 of a thickness of about 30 nm is deposited as a phase change material. The film 27 covers the groove structure to form recording tracks.

Figure 12F:
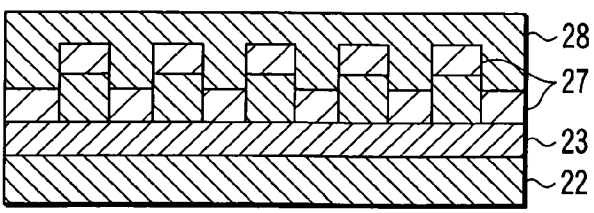
FIG. 12F is a process diagram of the process for manufacturing phase change optical recording media according to the second embodiment.

Then, as shown in FIG. 12F, an $SiO_2$ film 28 is deposited all over the surface of the transferred substrate. Thus, the $SiO_2$ film 28 protects the matrix layer 24 and the indium antimony tellurium film 27. After the deposition, the surface of the $SiO_2$ film 28 is flattened.

According to the present embodiment, the phase change recording media patterned at a pitch of 50 nm is formed substantially all over the surface of the 2.5-inch disk substrate, a plate-like structure. This provides ultra high-density phase change optical recording media. In the present embodiment, the 2.5-inch disk substrate is used as a plate-like structure. However, the present invention is not limited to this.

Third Embodiment

A third embodiment is an example in which a glass disk for a hard disk drive (HDD) is used as a plate-like structure. The third embodiment is applied to a magnetic transfer system that produces magnetic recording media with a high throughput (for example, Jpn. Pat. Appln. KOKAI Publication No. 1995-78337).

The magnetic transfer system requires a master disk having magnetic signals such as servo information recorded on its surface. It has hitherto been difficult to produce a master disk. However, the present invention allows the easy and inexpensive production of a magnetic transfer master disk to which the magnetic signals have been transferred.

The magnetic transfer involves a step of tightly contacting a master disk with a slave disk so as to establish a precise positional relationship. The manufacturing apparatus according to the first or second embodiment reduces the amount of misalignment between the disks to at most 1 nm when pressure is applied to the disks. Further, the disks are securely contacted with each other.

Accordingly, provided that an external bias magnetic field is applied with the master and slave disks pressurized between a pair of press surfaces, magnetization information from the master disk is transferred to the slave disk and uniformly recorded all over its surface. This allows magnetic recording media to be manufactured with a high throughput and a high yield.

The first to third embodiments have been described with reference to the specific examples. However, the present invention is not limited to these specific examples.

For example, the transferred substrate is not limited to the above embodiments. The structure, material, size, or the like of the transferred substrate may be changed or selected from alternatives.

Further, in the above embodiments, the groove is formed only in the inner peripheral surface of the mold. However, the groove may be formed in both inner and outer peripheral surfaces of the mold. Further, the groove may be formed only in the outer peripheral surface of the mold.

Fourth Embodiment

FIG. 13 is a sectional view of a manufacturing apparatus according to a fourth embodiment of the present invention.

As shown in FIG. 13, in the manufacturing apparatus according to the present embodiment, the bottom surface of the free shank 6 and the top surface of the projection 13 have a diameter larger than that of the workpiece (master 5 and transferred substrate 1). Thus, if no groove is present in the outer peripheral surface of the upper mold 9 or lower mold 10, the pressure exerted on the upper mold 9 and lower mold 10 by a pressure concentrating mechanism Ka concentrates at the outer peripheral part of the transferred substrate 1; the pressure concentrating mechanism Ka is composed of the free shank 6 and the projection 13.

However, if the grooves 9a and 10a are present in the outer peripheral surfaces of the upper mold 9 and lower mold 10 respectively, the grooves 9a and 10a distributes the pressure concentrating at the outer peripheral part, toward the central axes of the upper mold 9 and lower mold 10.

This manufacturing apparatus is applied to the manufacturing of a plate-like structure such as small-diameter recording media, for example, a 0.85-inch hard disk. Further, the size of the transferred substrate 1 varies but the present invention is applied to any size of the transferred substrate 1.

Fifth Embodiment

The manufacturing method according to the present invention comprises a nano imprint process of pressing the master 5 against the transferred substrate 1 under a pressure of several tens of to several hundreds MPa to transfer the concave and convex patterns on the master 5 to the resist film on the transferred substrate 1. Thus, uniform pressurization must be ensured. That is, it is necessary to avoid biasing the pressure distribution to minimize the amount of relative misalignment between the master 5 and the transferred substrate 1.

However, the surface of a glass disk, used as a material for the transferred substrate 1, is not always very flat. Certain concaves and convexes are present on the surface of the glass disk substrate. Further, the press surfaces of the upper mold 9 and lower mold 10 are not always very flat as in the case of the glass disk substrate. Certain concaves and convexes are present on the press surfaces.

Thus, in the present embodiment, the impact of the presence of concaves and convexes on nano imprinting will be considered.

FIG. 14 is a sectional view showing an essential part of the transferred substrate 1 pressurized between the upper mold 9 and the lower mold 10 according to a fifth embodiment of the present invention.

In this case, it is assumed that the master 5, the upper mold 9, and the lower mold 10 have no concaves or convexes and that only the transferred substrate 1 has a local convex portion of a size of about 2 μm. That is, a convex portion T of size 2 μm is provided on the transferred substrate 1.

The inventor applied a finite element method to the transferred substrate 1 to construct an accurate analysis model. In this analysis model, iron (low-carbon steel) is used as a material for the molds 9 and 10.

The results of the analysis will be described below.

FIG. 15A is a characteristic diagram of the distribution of pressure generated between the master 5 and the transferred substrate 1 according to the fifth embodiment. FIG. 15B is a characteristic diagram of the amount of relative misalignment between the master 5 and the transferred substrate 1 according to the fifth embodiment.

As shown in FIG. 15A, the distribution of the pressure between the master 5 and the transferred substrate 1 varies within the range from −10% to +17% with reference to $10^8$ Pa (about 1,000 atm.). Further, as shown in FIG. 15B, the maximum amount of misalignment between the master 5 and the transferred substrate 1 is 28 nm.

In this manner, the convex portion T on the transferred substrate 1 varies the distribution of the pressure between the master 5 and the transferred substrate 1. Marked misalignment occurs between the master 5 and the transferred substrate 1. Thus, to solve this problem, the inventor has proposed a method and apparatus for manufacturing a plate-like structure as described below. Even with the transferred substrate 1 with the convex portion T, the method and apparatus reduces the amount of misalignment between the master 5 and the transferred substrate 1 to greatly improve the precision of nano imprinting.

Figure 16A:
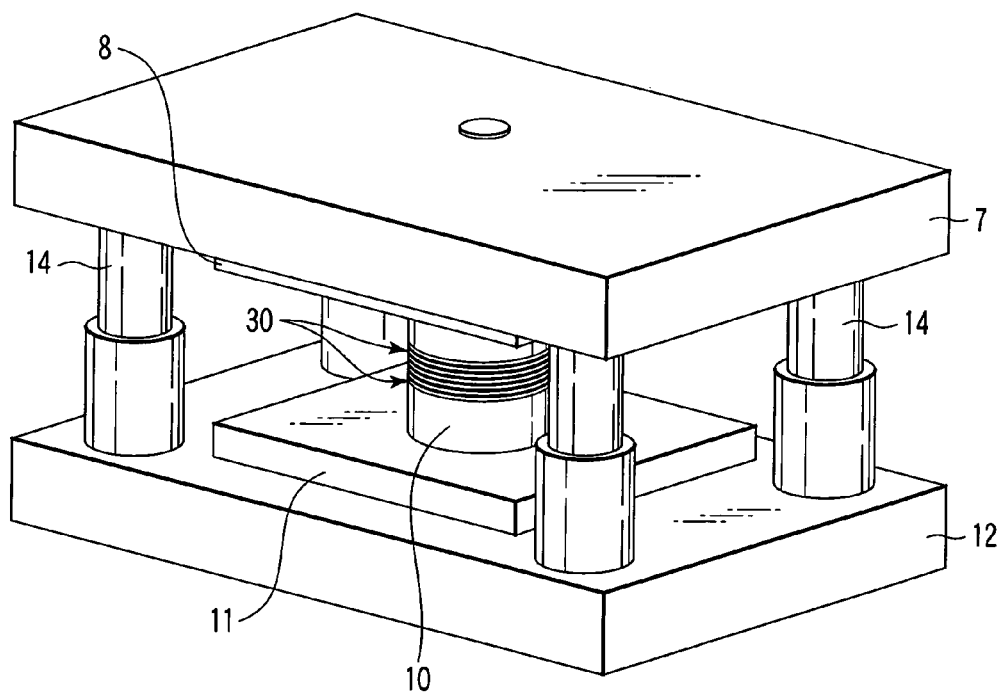
FIG. 16A is a perspective view of a manufacturing apparatus according to the fifth embodiment.
Figure 16B:
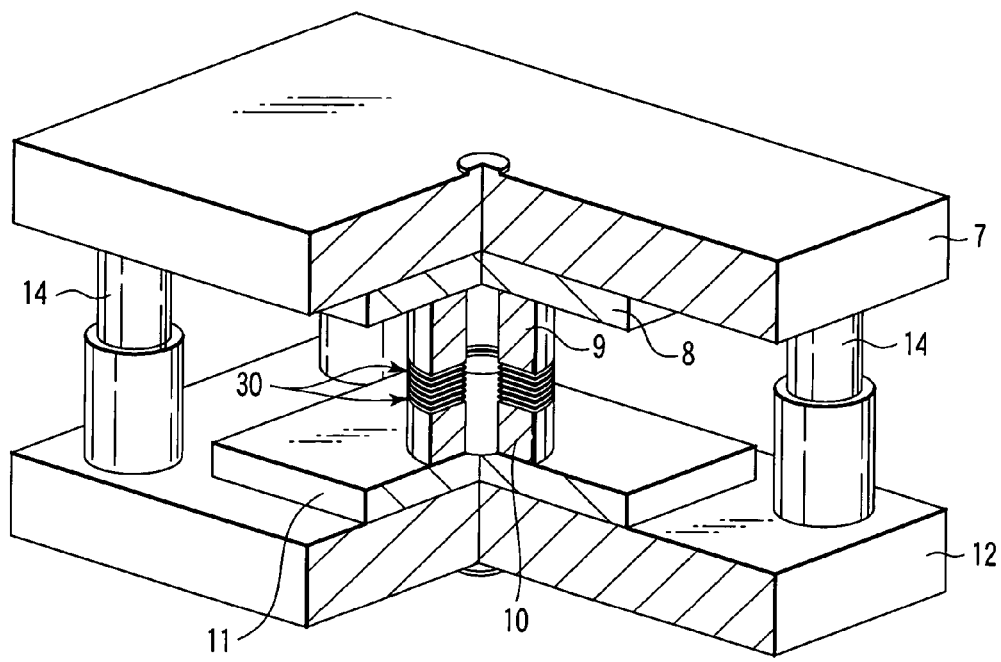
FIG. 16B is a partly cutaway perspective view of the manufacturing apparatus according to the fifth embodiment.

FIG. 16A is a perspective view of a manufacturing apparatus according to the fifth embodiment. FIG. 16B is a partly cutaway perspective view of the manufacturing apparatus according to the fifth embodiment.

As shown in FIGS. 16A and 16B, the manufacturing apparatus comprises, for example, an upper die set 7, an upper plate 8, an upper mold 9 having a hollow portion H formed along is central axis, two pressure equalizers 30, a lower mold 10 having a hollow portion H formed along is central axis, a lower plate 11, and a lower die set 12. The manufacturing apparatus is pressurized from above by the hydraulic press machine.

The upper die set 7 is attached to the lower die set 12 via a plurality of guide posts 14 so that the upper die set 7 can freely contact and leave the lower die set 12. The upper plate 8 is mounted on the bottom surface of the upper die set 7. The upper mold 9 is supported on the bottom surface of the upper plate 8. The lower plate 11 is mounted on the top surface of the lower die set 12. The lower mold 10 is supported on the top surface of the lower plate 11. In this case, the previously described free shank 6 and projection 13 are omitted.

The manufacturing apparatus is mounted in the common hydraulic press machine shown in FIG. 6. The master 5 and the transferred substrate 1 are sandwiched and pressurized between the pressure equalizers 30, described below.

Figure 17:
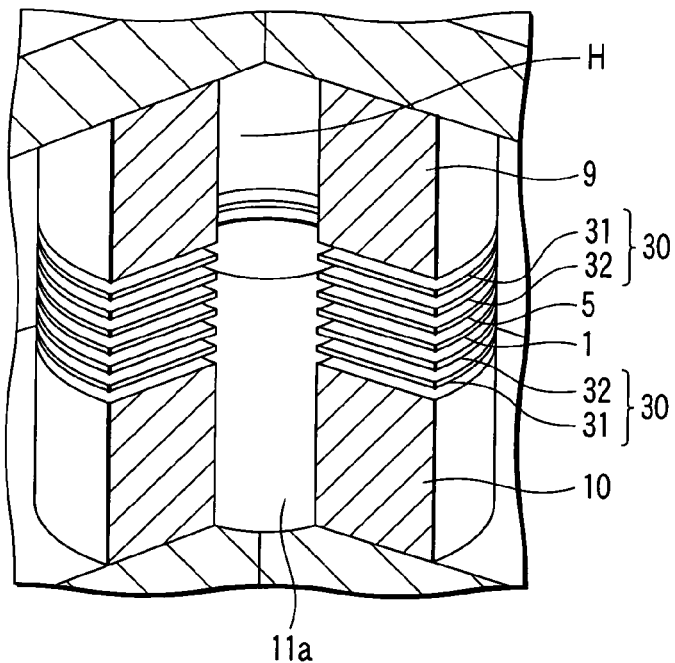
FIG. 17 is an enlarged sectional view showing an essential part of FIG. 16B.

FIG. 17 is an enlarged sectional view of an essential part of FIG. 16B.

As shown in FIG. 17, the pressure equalizer 30 is composed of a buffer layer 31 and a plate member 32. That is, in the present embodiment, the following are stacked in the following order from top to bottom: the upper die set 7, the upper plate 8, the upper mold 9, the buffer layer 31, the plate member 32, the master 5, the transferred substrate 1, the plate member 32, the buffer layer 31, the lower mold 10, the lower plate 11, and the lower die set 12. A pressure of about 325 kN (32 ton) is applied.

A material for the buffer layer 31 is a synthetic resin (for example, a PET resin) which is about 0.5 mm in thickness and which is softer than the master 5 and the transferred substrate 1. A material for the plate member 32 is an iron plate (low-carbon steel) of a thickness of about 1.0 mm.

The master 5 and the transferred substrate 1 are formed of the same materials as those previously described. However, a convex portion T of size about 2 μm is formed in a central part of the transferred substrate 1 as described in FIG. 14. Further, the size, shape, and material of the mold consisting of the upper mold 9 and lower mold 10 are the same as those previously described.

Figure 18:
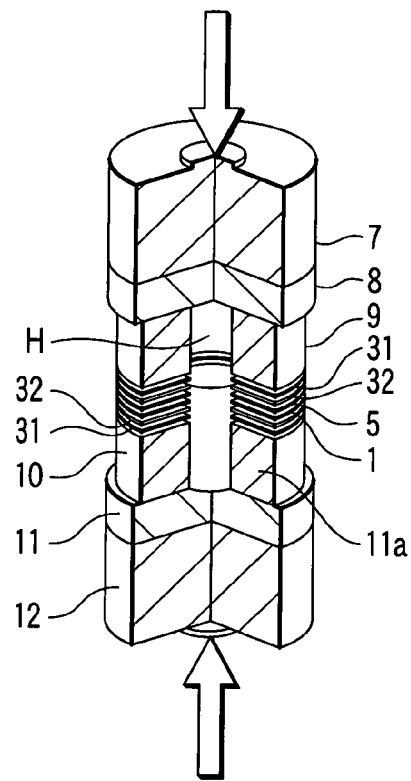
FIG. 18 is a view illustrating a method for applying pressure to a mold according to the fifth embodiment.

FIG. 18 is a diagram illustrating a method for applying pressure to the mold according to the fifth embodiment.

As shown by arrows in the figure, pressure is applied to the vicinity of central axis of the end surface of each of the die set 7 and die set 12. This allows a compressive load to concentrate at the hollow portions formed in the upper mold 9 and lower mold 10, that is, the vicinity of the inner peripheral surfaces of the upper mold 9 and lower mold 10. This is a requirement for eliminating the factor causing instability in connection with the biased abutment of the press surfaces.

The inventor used the finite element method to analyze the distribution of the pressure between the master 5 and the transferred substrate 1 and the relative alignment between the master 5 and the transferred substrate 1.

The results of the analysis will be described below.

FIG. 19A is a graph showing the distribution of pressure generated between the master 5 and the transferred substrate 1 according to the fifth embodiment. FIG. 19B is a graph of the amount of relative misalignment between the master 5 and the transferred substrate 1 according to the fifth embodiment.

As shown in FIG. 19A, the distribution of the pressure between the master 5 and the transferred substrate 1 is considerably uniform. The range of variation is −4% to +8% with reference to $10^8$ Pa (about 1,000 atm.). As shown in FIG. 19B, the amount of misalignment between the master 5 and the transferred substrate 1 decreased to 22 nm. That is, the use of the previously described manufacturing method and apparatus provides a robust design solution for a variation in the board thickness of the transferred substrate 1.

Now, description will be given of how the inventor obtained the previously described configuration.

As previously described, the applicant has proposed the room temperature imprinting technique in Jpn. Pat. Appln. KOKAI Publication No. 2003-157520. This technique is characterized in that a buffer layer is interposed between an upper mold and a transferred substrate; the buffer layer consists of a material softer than a master and the transferred substrate (PET resin) and in that pressure is applied to the transferred substrate via the buffer layer to transfer concave and convex patterns on the master to the surface of the transferred substrate.

If the transferred substrate has a varying board thickness, that is, the transferred substrate has convex portions, the buffer layer is elastically deformed under pressure. That is, the buffer layer acts as a cushion material that relaxes the pressure to absorb the variation in the thickness of the transferred substrate.

However, the PET resin, a material for the buffer layer, has a small elastic coefficient and a Poisson ratio of 0.3. Consequently, the buffer layer is likely to be expanded in a plane direction perpendicular to the axial direction when pressure is applied to the buffer layer in its axial direction.

Accordingly, when convex portions are provided at a position of the transferred substrate which contacts the buffer layer, the transferred substrate is moved in the plane direction together with the buffer layer. Thus, relative misalignment occurs between the master and the transferred substrate. Actually, the amount of relative misalignment between the master and the transferred substrate is of the order of μm.

Thus, the following conclusion was drawn. Provided that a structure which is soft in the axial direction (the direction in which pressure is applied) and which is rigid in the plane direction (the direction orthogonal to the axial direction) is interposed between the upper mold and the transferred substrate in place of the buffer layer, the convex portions of the transferred substrate are absorbed to suppress the relative misalignment between the master and the transferred substrate. As a result, all the conditions are met.

Thus, in the present embodiment, the pressure equalizers 30 are interposed between the mold that is the upper mold 9 or the lower mold 10 and the workpiece that is the master 5 and transferred substrate 1. The inventors executed analysis to find that all the conditions were met. In this case, as shown in FIGS. 20A to 20B, the master 5 is disposed under the transferred substrate 1.

FIG. 20A is a sectional view of the pressure equalizer 30 with no pressure applied the master 5 or the transferred substrate 1 according to the fifth embodiment. FIG. 20B is a sectional view of the pressure equalizer 30 with pressure applied to the master 5 and the transferred substrate 1 according to the fifth embodiment.

As shown in FIG. 20A, the master 5 and transferred substrate 1 to be pressurized are placed between the upper mold 9 and the lower mold 10. The transferred substrate 1 comprises the concave portion T, while the master 5 comprises no concave portion. The pressure equalizer 30 is interposed between the upper mold 9 and the transferred substrate 1. The pressure equalizer 30 is composed of a buffer layer 31 placed adjacent to the upper mold 9 and made of resin and a plate member 32 placed adjacent to the transferred substrate 1 and made of a metal. The buffer layer 31 and the plate member 32 are laid on top of each other. The plate material 32 and the buffer layer 31 are not joined together. The pressure equalizer 30 is also interposed between the lower mold 10 and the master 5. The pressure equalizer 30 is composed of a buffer layer 31 placed adjacent to the lower mold 10 and a plate member 32 placed adjacent to the master 5.

Description will be given only of the transferred substrate 1 having the convex portion T.

A compressive load imposed on the upper mold 9 is transmitted to the buffer layer 31, which is thus elastically deformed. That is, the buffer layer 31, which has a small elastic coefficient, is contracted in the axial direction and expanded in the plane direction as shown by the alternate long and two short dashes line in FIG. 20B. The buffer layer 31 thus absorbs the convex portion T of the transferred substrate 1 via the plate member 32. The compressive load transmitted to the buffer layer 31 acts on the plate member 32.

When the buffer layer 31 is expanded in the plane direction, the plate member 32 receives a force that shifts the plate member 32 from the buffer layer 31 in the plane direction. However, the iron plate (low-carbon steel) constituting the plate member 32 is made of a hard material. The iron plate has a much larger modulus of longitudinal elasticity than the PET resin constituting the buffer layer 31 (about 100 times). Consequently, when the buffer layer 31 is deformed, expanding in the plane direction, slippage occurs on the interface. This prevents the plate member 32 from moving in the plane direction even.

On the other hand, the plate member 32 is formed to be thin enough to be deformed to follow the shape of the transferred substrate 1 when subjected to a compressive load from the buffer layer 31; the plate member 32 comes into direct contact with the transferred substrate 1. The plate member 32 thus uniformly transmits the compressive load to the transferred substrate 1. Even if the concave portion T is present all over the surface of the transferred substrate, the plate member 32 uniformly transmits the compressive load to the transferred substrate 1. The deformation of the plate member 32 is not "contraction under a vertical load" but "out-of-plane deformation of a leaf spring". Therefore, the plate member 32 is not significantly expanded in the plane direction.

As described above, the plate member 32, which contacts the master 5 and transferred substrate 1, is not moved in the plane direction even when pressurized by the upper mold 9 and lower mold 10. As a result, the transferred substrate 1 is not moved together with the plate member 32 in the plane direction. Therefore, relative misalignment does not occur between the master 5 and the transferred substrate 1. This meets all the requirements for the nano imprint process.

Exactly the same effects are produced even if the transferred substrate 1 has a concave portion or even if the transferred substrate 1 has a plurality of concave and convex portions. Not only if the transferred substrate 1 has a concave and a convex but also if the master 5 has a concave and a convex portion, exactly the same effects are produced provided that the pressure equalizer 30 is interposed between the master 5 and the lower mold 10. Further, the thickness of the plate member 32 is appropriately set in accordance with specifications such as the material constituting the plate member and the flatness of the transferred substrate 1.

Now, description will be given of a manufacturing apparatus according to a variation of the fifth embodiment.

In the present variation, the previously described grooves 9a and 10a (see FIG. 7) are formed in the inner peripheral surfaces of the upper mold 9 and lower mold 10, respectively, according to the fifth embodiment. That is, the manufacturing apparatus according to the present variation comprises a technique for providing the pressure equalizer 30 between the upper mold 9 and the master 5 or between the lower mold 10 and transferred substrate 1 and a technique for forming the grooves 9a and 10a in the inner peripheral surfaces of the upper mold 9 and lower mold 10 respectively.

As described in the first embodiment, when the grooves 9a and 10a are formed in the peripheral surfaces of hollow portions H of the upper mold 9 and lower mold 10 respectively, a difference in pressure between the master 5 and the flat transferred substrate 1 is at most 1%. The grooves 9a and 10a are thus effective.

Thus, the inventor used the manufacturing apparatus having the grooves 9a and 10a and the pressure equalizer 30 to make experiments on transfers to the transferred substrate 1 having a convex portion T of a size of about 2 μm.

FIG. 21A is a graph showing the distribution of pressure generated between the master 5 and the transferred substrate 1 according to the variation of the fifth embodiment. FIG. 21B is a graph of the amount of relative misalignment between the master 5 and the transferred substrate 1 according to the variation of the fifth embodiment.

FIG. 21A shows that the pressure distribution is more uniform. This demonstrates that the means for providing the pressure equalizer 30 is consistent with the means for providing the grooves 9a and 10a in the upper mold 9 and lower mold 10 respectively.

Sixth Embodiment

Figure 22:
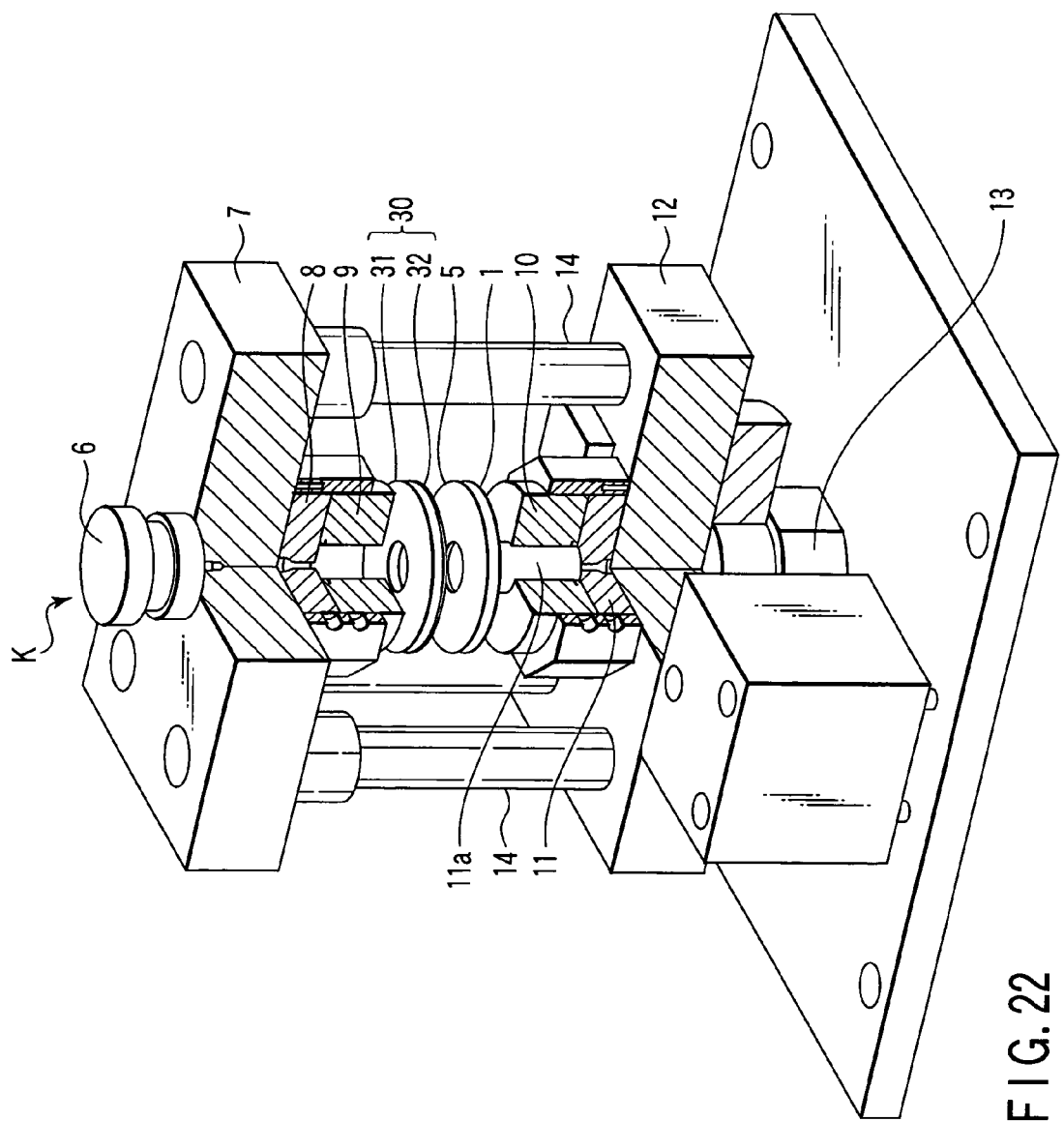
FIG. 22 is a partly cutaway perspective view of a manufacturing apparatus according to a sixth embodiment of the present invention.
Figure 23:
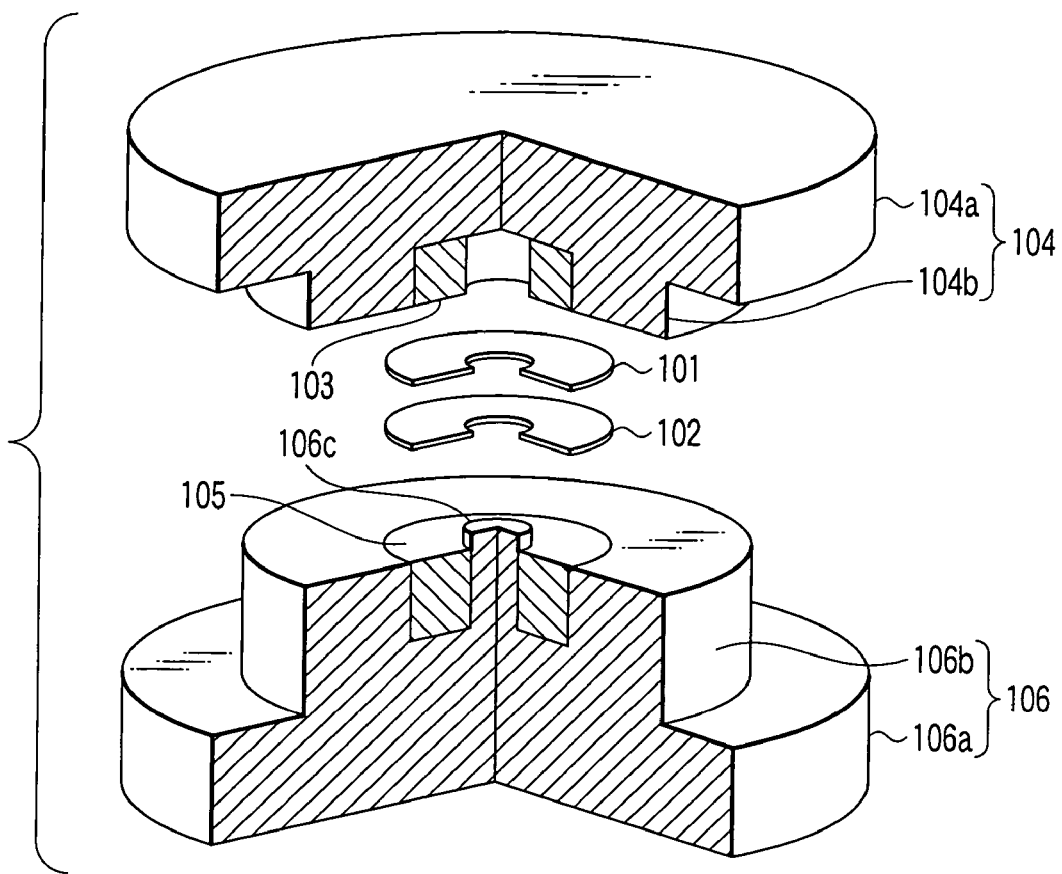
FIG. 23 is a partly cutaway perspective view of a press machine used for a press process with the room temperature imprint technique.
Figure 26:
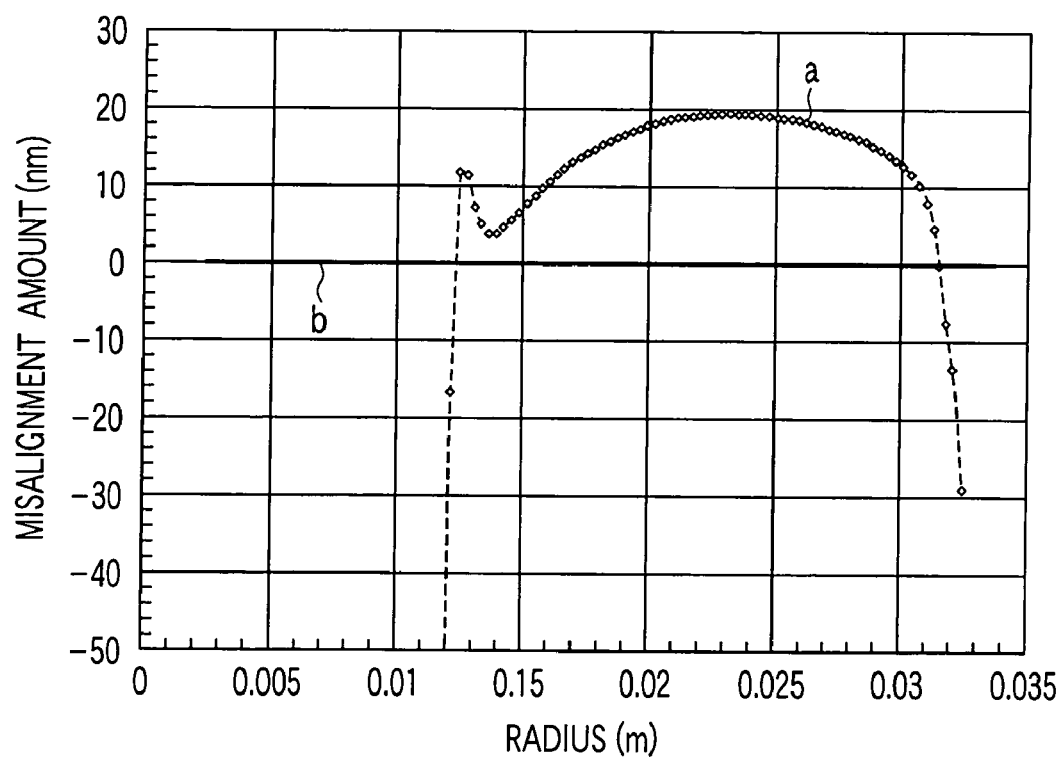
FIG. 26 is a graph showing the amount of relative misalignment between the master and the transferred substrate if the room temperature imprint technique is used.

FIG. 22 is a partly cutaway perspective view showing a manufacturing apparatus according to a sixth embodiment of the present invention.

As shown in FIG. 22, the manufacturing apparatus comprises the free shank 6, the upper die set 7, the upper plate 8, the upper mold 9, the lower mold 10, the lower plate 11, the lower die set 12, and the projection 13 arranged in this order from top to bottom. The manufacturing apparatus is pressurized from above by the hydraulic press machine.

The upper die set 7 is attached to the lower die set 12 via a plurality of guide posts 14 so that the upper die set 7 can freely contact and leave the lower die set 12. The upper plate 8 is mounted on the bottom surface of the upper die set 7. The upper mold 9 is supported on the bottom surface of the upper plate 8. The lower plate 11 is mounted on the top surface of the lower die set 12. The lower mold 10 is supported on the top surface of the lower plate 11.

The pair of press surfaces according to the present invention is composed of the bottom surface of the upper mold 9 and the top surface of the lower mold 10. The master 5 and the transferred substrate 1 are sandwiched and pressurized between the bottom surface of the upper mold 9 and the top surface of the lower mold 10. The pressure equalizer 30 is interposed only between the upper mold 9 and the master 5; the pressure equalizer 30 consists of the buffer layer 31 and the plate member 32.

Even if the pressure equalizer 30 is thus interposed only between the upper mold 9 and the master 5, it absorbs the concave and convex formed on the master 5 or transferred substrate 1. That is, pressure is applied uniformly all over the surfaces of the master 5 and transferred substrate 1.

The present invention is not limited to the previously described embodiments proper. In implementation, the present invention can be embodied by varying the components of the embodiments without departing from the spirit of the present invention. Various inventions can be formed by appropriately combining a plurality of the components disclosed in the previously described embodiments.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method for manufacturing a plate-like structure, the method comprising:
    a step of transferring concave and convex patterns on a master to a surface of a transferred substrate by sandwiching the master provided with the concave and convex patterns and the transferred substrate, between a press surface of a hollow cylindrical upper mold and a press surface of a hollow cylindrical lower mold, and pressurizing central parts of the upper and lower molds to apply pressure to the master and the transferred substrate, wherein
    a compressive load imposed on inner peripheral portions of the upper and lower molds is blocked and distributed toward outer peripheries of the upper and lower molds, and
    at least one of the press surfaces of the upper and lower molds includes
        a buffer layer which is expanded or contracted in a direction parallel to the press surface by the pressure applied by the upper and lower molds, to absorb deformation of the master and transferred substrate; and
        a plate member provided on a surface of the buffer layer, which plate member is adjacent to the master or the transferred substrate, the plate member being deformed by the pressure received via the buffer layer, so as to follow the shape of the master or transferred substrate.

2. The method for manufacturing a plate-like structure according to claim 1, wherein a material for the buffer layer is any one of plastics, rubber, and a polyethylene terephthalate resin.

3. A method for manufacturing a plate-like structure, the method comprising:
    a step of transferring concave and convex patterns on a master to a surface of a transferred substrate by sandwiching the master provided with the concave and convex patterns and the transferred substrate, between a press surface of an upper mold and a press surface of a lower mold, and applying pressure to the master and the transferred substrate, wherein
    a compressive load imposed on outer peripheral portions of the upper and lower molds is distributed toward central axes of the upper and lower molds, and
    at least one of the press surfaces of the upper and lower molds includes
        a buffer layer which is expanded or contracted in a direction parallel to the press surface by the pressure applied by the upper and lower molds, to absorb deformation of the master and transferred substrate; and
        a plate member provided on a surface of the buffer layer, which plate member is adjacent to the master or the transferred substrate, the plate member being deformed by the pressure received via the buffer layer, so as to follow the shape of the master or transferred substrate.

4. The method for manufacturing a plate-like structure according to claim 3, wherein a material for the buffer layer is any one of plastics, rubber, and a polyethylene terephthalate resin.

* * * * *